(12) United States Patent
Hayford et al.

(10) Patent No.: US 7,843,348 B2
(45) Date of Patent: Nov. 30, 2010

(54) SYSTEM AND METHOD FOR TRACKING PERSONNEL AND EQUIPMENT

(75) Inventors: Tracy L. Hayford, Newburgh, IN (US); David Clardy, Lexington, KY (US); Mark Watson, Lexington, KY (US); Justin E. Bennett, Evansville, IN (US); Paul R. Blaylock, Evansville, IN (US); Timothy M. Debaillie, Evansville, IN (US); Mike E. Ciholas, Evansville, IN (US); Evan M. Buchanan, Evansville, IN (US); Christopher Elpers, Evansville, IN (US)

(73) Assignee: Alliance Coal, LLC, Lexington, KY (US)

( * ) Notice: Subject to any disclaimer, the term of this patent is extended or adjusted under 35 U.S.C. 154(b) by 308 days.

(21) Appl. No.: 12/139,268

(22) Filed: Jun. 13, 2008

(65) Prior Publication Data

US 2008/0266110 A1    Oct. 30, 2008

Related U.S. Application Data

(63) Continuation-in-part of application No. 12/017,888, filed on Jan. 22, 2008.

(60) Provisional application No. 60/943,807, filed on Jun. 13, 2007, provisional application No. 60/885,854, filed on Jan. 19, 2007.

(51) Int. Cl.
*G08B 13/14* (2006.01)
(52) U.S. Cl. .................... 340/572.8; 340/531; 340/679; 340/501
(58) Field of Classification Search .............. 340/572.8, 340/572.1–572.7, 568.1, 539.1, 531, 679, 340/541, 550, 584, 590, 501, 506
See application file for complete search history.

(56) References Cited

U.S. PATENT DOCUMENTS 6,301,514 B1 * 10/2001 Canada et al. .............. 700/108

(Continued)

FOREIGN PATENT DOCUMENTS

KR    1020050063414    6/2005

(Continued)

OTHER PUBLICATIONS

ISA/KR, International Search Report and Written Opinion for international application No. PCT/US2008/066982, mailed Dec. 17, 2008.

*Primary Examiner*—Daniel Previl
(74) *Attorney, Agent, or Firm*—Stites & Harbison, PLLC; Jeffrey A. Haeberlin

(57) ABSTRACT

A system for tracking personnel and equipment in hazardous environments in pre or post-accident situations includes an intrinsically safe tracking tag and an intrinsically safe reader system. The intrinsically safe tracking tag transmits identification and status information to the intrinsically safe reader system, which includes a plurality of intrinsically safe antennas and a hub cable driver. In one embodiment, antennas are located at known positions in the hazardous environment and connected via a redundant, wired-mesh topology. The wired-mesh topology also allows more flexible antenna placement than line-of-sight wireless-mesh systems. The hub cable driver provides intrinsically safe power to and communication with the antennas using communication cables, receives data signals from the antennas, and transmits the data signals to a server. The server stores the data signals in a storage device and is connected to a workstation. The workstation retrieves the stored data to track persons or equipment.

16 Claims, 22 Drawing Sheets

U.S. PATENT DOCUMENTS

| | | |
|---|---|---|
| 6,353,406 B1 | 3/2002 | Lanzl et al. |
| 7,014,502 B2 * | 3/2006 | Rasmussen ................ 439/578 |
| 7,659,857 B2 * | 2/2010 | King ......................... 343/702 |
| 7,688,196 B2 | 3/2010 | Hannah |
| 7,715,983 B2 * | 5/2010 | Barrus et al. .................. 702/2 |
| 2004/0260506 A1 | 12/2004 | Jones et al. |
| 2007/0001778 A1 * | 1/2007 | Lundberg et al. ........ 333/24 R |
| 2007/0001809 A1 * | 1/2007 | Kodukula et al. .......... 340/10.1 |
| 2008/0109883 A1 * | 5/2008 | Hernoud et al. ................ 726/5 |
| 2008/0137589 A1 | 6/2008 | Barrett |

FOREIGN PATENT DOCUMENTS

| | | |
|---|---|---|
| KR | 1020060005827 | 1/2006 |

* cited by examiner

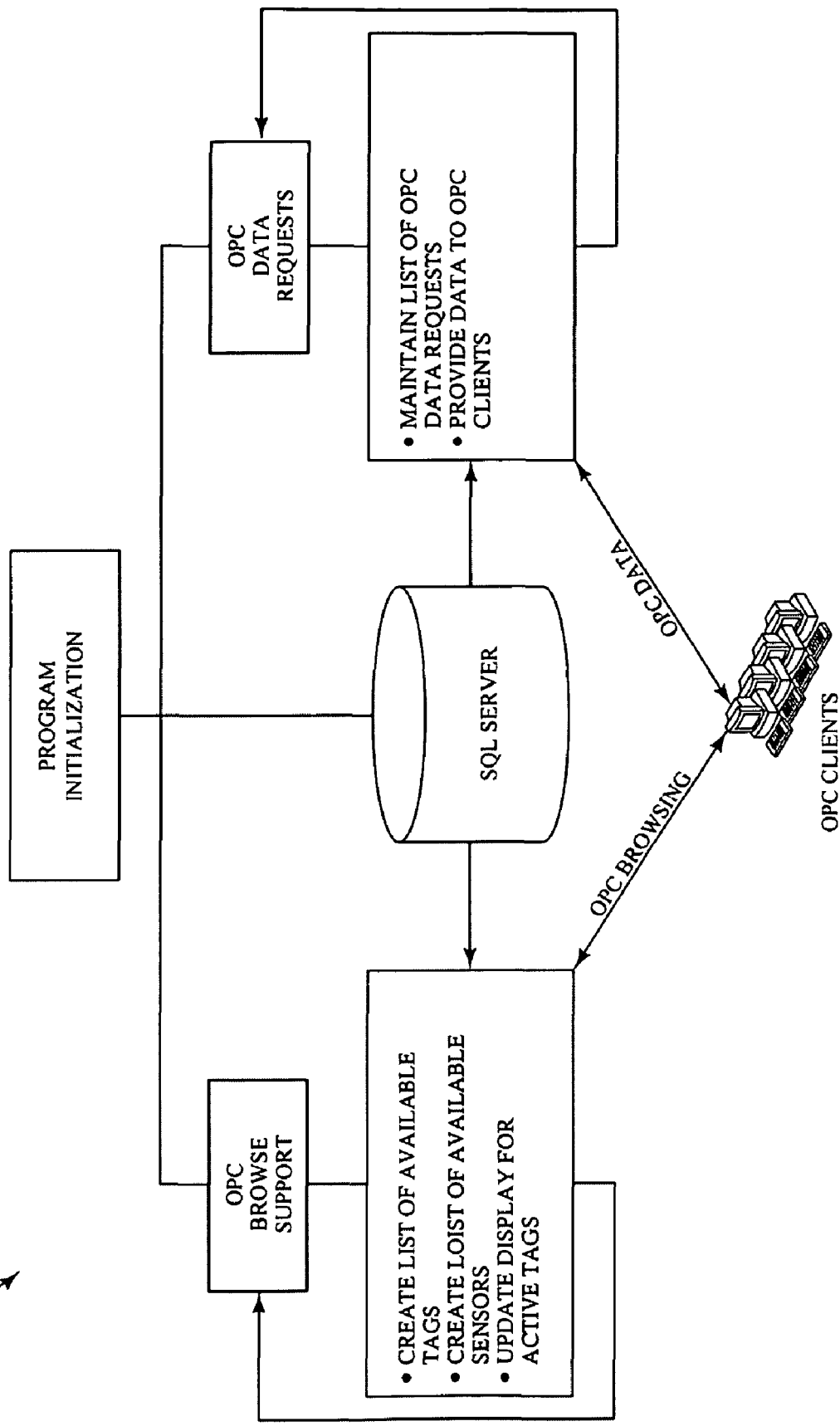

SYSTEM AND METHOD FOR TRACKING PERSONNEL AND EQUIPMENT

CROSS-REFERENCE TO RELATED APPLICATIONS

This application claims the benefit of U.S. Provisional Patent Application No. 60/943,807, filed Jun. 13, 2007, and also is a continuation-in-part of prior U.S. Non-provisional patent application Ser. No. 12/017,888, filed Jan. 22, 2008, which claims the benefit of U.S. Provisional Patent Application No. 60/885,854, filed Jan. 19, 2007, the entire disclosures of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to tracking personnel and equipment in hazardous environments, such as underground mines, foundries, mills, large ships, refineries, heavy industry environments, etc., where tracking systems based on GPS (global positioning system) and other technologies are inoperable or do not function.

2. Description of Prior Art

Prior art systems and methods for tracking personnel and equipment in hazardous environments having poor radio signal propagation characteristics lack desired "granularity" (i.e., precision) in determining the location of the personnel and equipment in the hazardous environment.

Additionally, prior art systems may use tracking tags that are not permanently assigned to a particular person or piece of equipment, creating an issue with the accuracy and confidence in identification of the actual person or piece of equipment associated with a particular tracking tag.

Further, since hazardous environments can be "explosive" environments, the tracking system components could be an ignition source if not properly designed.

Some hazardous environments, such as underground mines, can cover miles of territory and may have power and communication taps only every 3,000 to 5,000 feet, typically corresponding to belt heads. Prior tracking systems that relied on power and communication taps were limited to the physical availability of such utilities, however, it is desired to know where personnel and equipment are with more granularity, such as within 1,000 feet or less.

In another example, in a mill environment, particularly an aluminum mill, a fire suppression system may need to be deployed in a basement or other enclosed structure. Deployment of the fire suppression system may create a condition where the basement or other enclosed structure does not contain enough oxygen to support life. In this scenario, it is desired to verify that all personnel have exited from the structure before deployment of the fire suppression system. Because of the enclosed structure, GPS-based systems do not reliably function.

In yet another example, a refinery having overhead pipes and tanks may create an environment where GPS signals cannot be reliably received.

In a still further example, a large ship may include a large enclosed area below deck where tracking of personnel is desired, such as for verification that all personnel have abandoned ship, but where GPS signals cannot be reliably received.

BRIEF SUMMARY OF THE INVENTION

In accordance with a first aspect of the invention, a system for tracking personnel and equipment includes a tracking tag and an intrinsically safe reader system. The system is useful in hazardous environments in both pre-accident and post-accident situations. The tracking tag is for being attached to a person or a piece of equipment in the hazardous environment. The tracking tag is intrinsically safe and periodically transmits a radio signal containing a unique tracking tag identification code identifying the tracking tag. The intrinsically safe reader system includes a hub cable driver and a plurality of intrinsically safe antennas or antenna devices. The hub cable driver and the plurality of intrinsically safe antennas are connected by communication cables. The hub cable driver is configured to provide intrinsically safe power to and communication with the plurality of intrinsically safe antennas over the communication cables. The plurality of intrinsically safe antennas are located at known positions in the hazardous environment in a wired-mesh, redundant connective infrastructure topology that is self-healing. The wired-mesh topology allows more flexible antenna placement than line-of-sight wireless-mesh systems. Each intrinsically safe antenna is configured to receive the radio signal from said tracking tag and transmit a data signal to the hub cable driver over the communication cables. The data signal contains an antenna identification code identifying the antenna and a tracking tag identification code identifying the tracking tag. The system is capable of continuing to operate in an explosive environment due to the intrinsically safe nature of the intrinsically safe tracking tag, the plurality of intrinsically safe antennas, and the intrinsically safe power and communication from the hub cable driver. Further, the redundant connective infrastructure topology enables the system to continue to operate despite a communication disruption at a location along the redundant connective infrastructure topology.

The intrinsically safe tracking tag may be attached to a hard hat worn by a person in the hazardous environment. In this scenario, the tracking tag is referred to as a personnel tag.

The intrinsically safe tracking tag may also be an equipment tag attached to a piece of equipment located in the hazardous environment. The intrinsically safe equipment tag is for receiving equipment status and location information for the piece of equipment and periodically transmitting a radio signal containing a unique equipment tag identification code identifying the intrinsically safe equipment tag and the equipment status and location information.

Each intrinsically safe antenna may have a plurality of communication ports for connecting with a plurality of other antennas, and the plurality of communication ports may be un-powered and disconnected from each other until a command is received to power up and connect selected ones of the plurality of communication ports. Further still, each intrinsically safe antenna may have a first voltage domain, a switching regulator, and a second voltage domain, wherein each intrinsically safe antenna, to maximize intrinsic safety, receives power at a first voltage in the first voltage domain, and converts the power at the first voltage to power at a second voltage for use in the second voltage domain using the switching regulator.

In another implementation, the hub cable driver has an output port, an IS protection block, and a hub microcontroller. The output port is for providing the intrinsically safe power and communication. The IS protection block is for detecting current and voltage levels at the output port. The hub microcontroller is for receiving the current and voltage levels from the IS protection block and disconnecting power from the output port when necessary to provide the intrinsically safe power and communication to the plurality of intrinsically safe antennas.

Yet another implementation includes an intrinsically safe atmospheric sensor positioned at a known location in the hazardous environment and in communication with the hub cable driver. The intrinsically safe atmospheric sensor is configured to: sense a gas level in an atmosphere at the intrinsically safe atmospheric sensor; and periodically transmit a signal to the hub cable driver containing a unique identification code identifying the intrinsically safe atmospheric sensor and a gas level reading value indicating a sensed gas level. The intrinsically safe atmospheric sensor may be a wireless atmospheric sensor or may be in communication with the hub cable driver by a communication cable. In the case of connection by a communication cable, the intrinsically safe atmospheric sensor is further configured to receive power from the hub cable driver via the communication cable.

In accordance with a second aspect of the invention, a system for tracking personnel and equipment in a hazardous environment includes: a plurality of tracking tags; an intrinsically safe reader system; a server database; and a server. Each tracking tag is for periodically transmitting a radio message containing a unique tracking tag ID. Each tracking tag is for being attached to a different person or piece of equipment present in the hazardous environment. Further, each tracking tag is intrinsically safe. The intrinsically safe reader system includes a hub cable driver and a plurality of intrinsically safe antennas connected to the hub cable driver and to each other by communication cables in a redundant connective infrastructure topology. Each antenna is located at a known position in the hazardous environment for receiving radio messages from nearby tracking tags, determining a signal strength value of each received radio message, and sending a tag data message for each received radio message to the hub cable driver. Each tag data message includes the received radio message, an antenna ID of the receiving antenna, and the signal strength value. The server includes: a server module, a manager module and a view module. The server module is for receiving tag data messages from the hub cable driver, determining a location of each tracking tag by determining the antenna receiving the radio message having a highest signal strength value. The manager module is for maintaining a live tag data table in said server database, the live tag data table containing current location data for each tracking tag. The view module is for generating a display of a current location of each tracking tag on a map of at least a portion of the hazardous environment, and for generating selected displays of data for each tracking tag.

According to one implementation of the second aspect of the invention, the system further includes at least one atmospheric sensor in communication with the hub cable driver, and the server further includes a sensor data shared memory.

According to another implementation, the system further includes a monitor module for providing e-mail support for database reports and status notifications. The monitor module may be further for reading and processing commands contained in e-mail messages received from an e-mail server.

According to yet another implementation, the system includes a key module for providing a means to control licensing based a number of antennas and tracking tags permitted.

In yet a further implementation, the system includes an OPC module for allowing OPC access to the server by external clients.

The view module may be further for setting an alarm to sound if a tracking tag known to leave a detectable vicinity of the intrinsically safe reader system does not reappear in the detectable vicinity of the intrinsically safe reader system in a predetermined amount of time.

Other features and advantages of the invention will be set forth in, or apparent from, the detailed description of preferred embodiments of the invention found below.

BRIEF DESCRIPTION OF THE SEVERAL VIEWS OF THE DRAWINGS

FIG. 22 is a process chart of an exemplary OPC module of the exemplary software system of FIG. 16.

DETAILED DESCRIPTION OF EXEMPLARY EMBODIMENTS OF THE INVENTION

For the purpose of this document, "intrinsically safe" shall be as defined by the U.S. Department of Labor, Mine Safety and Health Administration (MSHA).

Further, for the purpose of this document, "hazardous environments" will be described with reference to underground mines, although is shall be understood that the system and method described has applications in any hazardous environment, including underground mines, as well as foundries, mills, large ships, refineries, heavy industry environments, etc.

A. System

Figure 1:
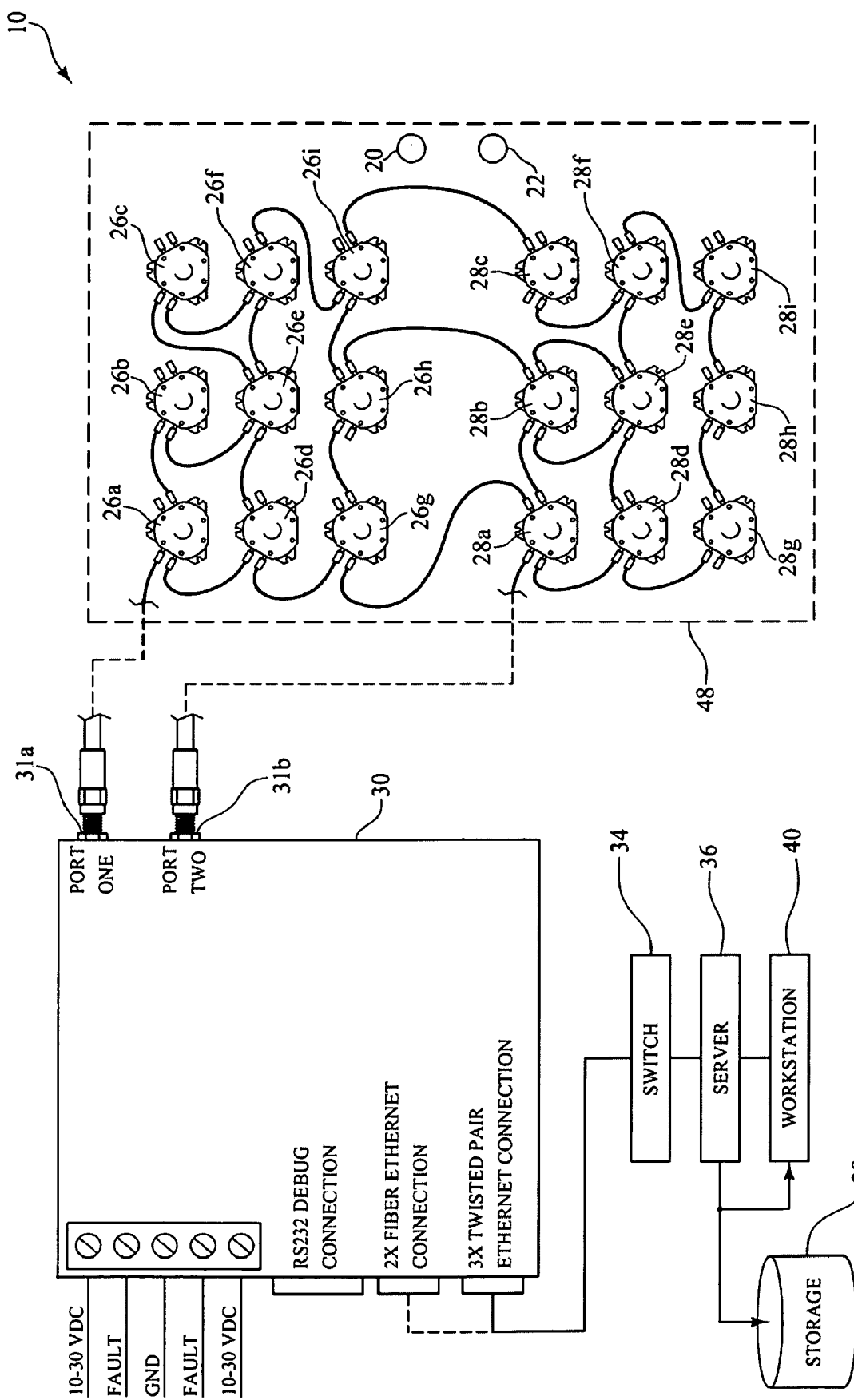
FIG. 1 is a functional block diagram of an exemplary system for tracking personnel and equipment in a hazardous environment according to the invention.

FIG. 1 shows an exemplary system 10 for tracking personnel and equipment in a hazardous environment in pre or post-accident situations including: an intrinsically safe personnel tag 20 (although only one tag is shown, in use there would be multiple such tags), an intrinsically safe equipment tag 22 (again, although only one tag is shown, in use there would be multiple such tags), a first group of intrinsically safe antennas 26a-26i, a second group of intrinsically safe antenna 28a-28i, a hub cable driver 30, a data switch 34, a server 36, data storage 38, and a workstation 40. The hub 30, first group of antennas 26a-26i, and second group of antennas 28a-28i, are connected by segments of communication cable, preferably coaxial cable. The exemplary system 10 is an electronic safety system designed specifically for hazardous environments 48 to determine and report on the location of personnel and equipment. Advantageously, the exemplary system 10 is based on industry-standard Radio Frequency Identification (RFID) technology used in many commercial applications, such as: turnpike passes, marathon/running events, and door security systems, although other radio technologies are within the spirit and scope of the invention as claimed.

The exemplary system 10 is focused on improving safety through the continuous tracking of personnel and assets. This is accomplished in two parts. The first part consists of the intrinsically safe personnel tag(s) 20 and the intrinsically safe equipment tag(s) 22 having transmitters that periodically send identification data to a system of deployed antennas. The second part consists of a dense mesh of the antennas 26a-i, 28a-i, redundant communications paths and a network that relays collected data for analysis and storage.

An intrinsically safe reader system is made up of the multiple regularly spaced antennas 26a-i, 28a-i redundantly interconnected with communication cable, such as coaxial cable, and the hub cable driver 30 that feeds power into and couples bidirectional data onto the communication cable. Each antenna 26a-i, 28a-i is intrinsically safe, and may be deployed in gassy areas. In the exemplary system 10, each antenna 26, 28 has four ports that may be used concurrently, and the hub cable driver 30 may feed two antenna networks 26, 28 simultaneously. The hub cable driver 30 is not permissible, and is preferably installed in fresh air with standard Ethernet connectivity and a local DC power supply.

The purpose of the intrinsically safe personnel tag 20 and the intrinsically safe equipment tag 22 is to periodically send a digital radio message containing an ID code that can be received by the networked antennas 26a-i, 28a-i installed in the hazardous environment 48. The personnel tag 20 is intended to be worn by a single person at all times while they are in the hazardous environment 48, including into areas where the tag 20 needs to be permissible. The equipment tag 22 is intended to be placed on a piece of equipment to be tracked. The intrinsically safe personnel tag 20 and the intrinsically safe equipment tag 22 are each housed in a durable plastic housing that is sealed for environmental reasons. The circuit inside the housing is intrinsically safe.

As will be explained in more detail below, the exemplary system 10 is capable of continuing to operate in a hazardous environment 48 post-accident situation due to the intrinsically safe nature of the intrinsically safe personnel tag 20, the intrinsically safe equipment tag 22 and the antennas 26a-26i, 28a-28i. Thus, since all of the elements of the system 10 that are located in the hazardous environment 48 are intrinsically safe, the system 10 can continue to operate in a gassy environment, and continue to provide personnel and equipment monitoring following an accident or a ventilation disruption in a hazardous environment 48.

Even further, and as will be explained below, the system 10 is fault-tolerant and self-diagnosing. The components of the system 10 monitor themselves and the system 10 reconfigures itself to provide alternate power and communications paths. Thus, in the event of a failure, such as a communication disruption at a location along an antenna (e.g. 26a or 28a), the redundant connective infrastructure enables unaffected antennas (e.g. 26b or 28b) to continue to operate. Additionally, when a problem is detected, the non-hazardous environment components (i.e., the hub cable driver 30, switch 34, server 36, storage 38 and workstation 40) are informed of the problem and an operator is notified of the problem.

It should be noted that in a practical scenario, there would be many personnel and equipment pieces in operation in a hazardous environment 48, and each would have a respective unique personnel tag 20 or unique equipment tag 22. Thus, the single personnel tag 20 and equipment tag 22, are used for simplification, with the understanding that an operational scenario would have a plurality of such devices in use simultaneously in the hazardous environment, with the descriptions provided below applicable to such an operational scenario.

Also, in a practical scenario, there would be many antennas (e.g. 26a-26i, 28a-28i) located throughout the hazardous environment to achieve the desired level of granularity. Advantageously, the design of the system 10 allows each antenna in a network to be connected to any other antenna via a segment of communication cable. Each antenna can be interconnected to one or more other antennas via the communication cable segments.

FIGS. 2-5 show sample system configurations in typical mine settings, as an example of a potentially hazardous environment where personnel and equipment monitoring is desired.

Figure 2:
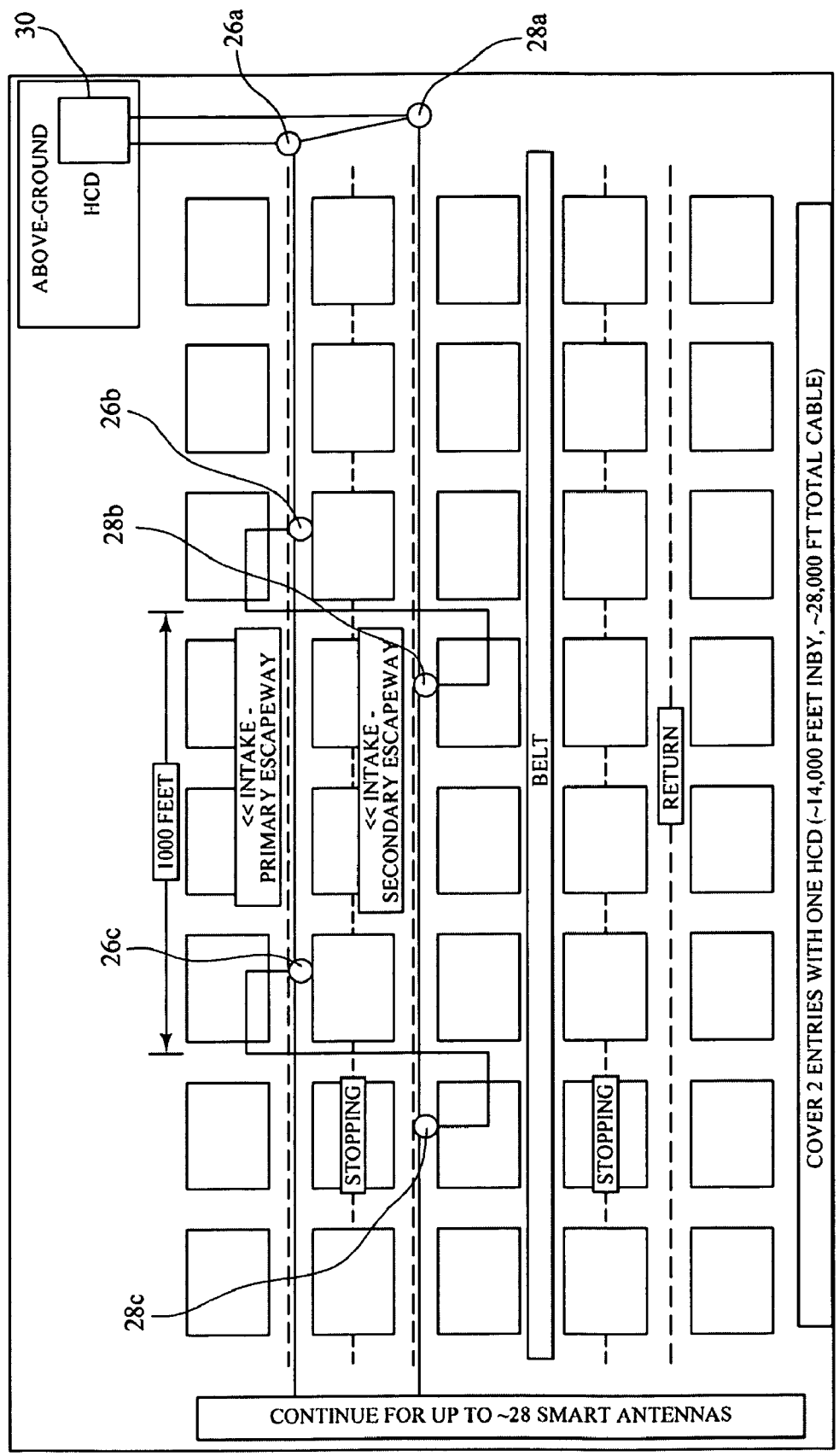
FIG. 2-FIG. 5 are schematic diagrams of sample system configurations in a typical mine setting.

FIG. 2 shows a horizontal slice of a mine having a system 50 configured where antennas 26a-c, 28a-c are located one thousand feet apart. A personnel tag 20 that is between antennas (e.g. 26a, 26b) will most likely be picked up by both antennas (e.g. 26a, 26b) producing a granularity of about five hundred feet and full-time monitoring of the location of the personnel tag 20.

Figure 3:
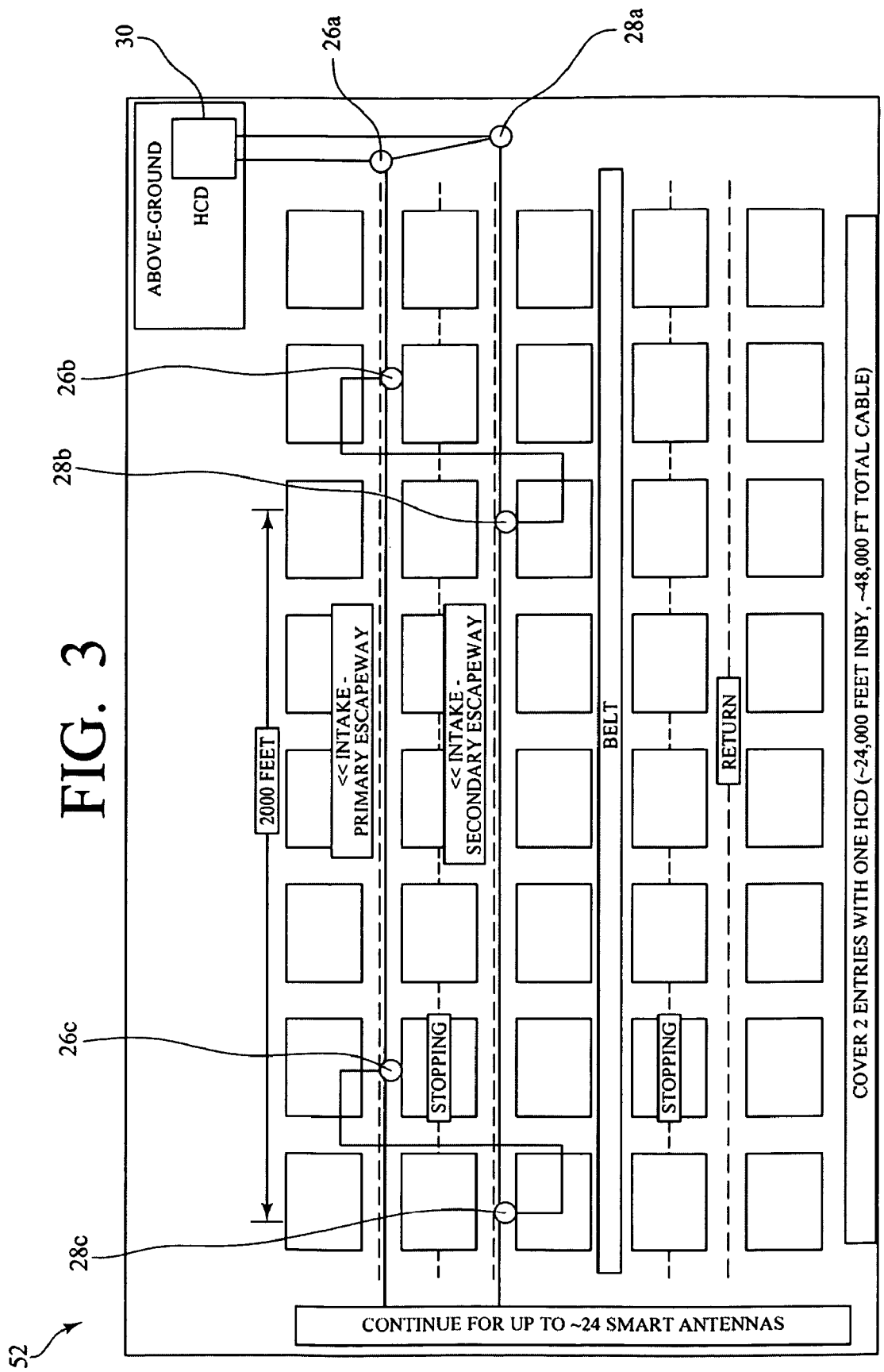

FIG. 3 shows a horizontal slice of a mine having a system 52 configured where antennas 26a-c, 28a-c are located two thousand feet apart.

The spacing limits the number of antennas 26a-c, 28a-c that the can be used because longer cables will have higher resistance, and therefore a smaller number of readers that can be on the antenna network 26, 28. For example, with one thousand feet spacing, the system 50 can use twenty-eight total antennas 26a-x, 28a-x (calculated as fourteen thousand feet in-by and fourteen thousand feet out, with an antenna 26a-x, 28a-x every one thousand feet). With two thousand feet spacing, the system 52 can use twenty-four total antennas 26a-x, 28a-x (calculated as twenty-four thousand feet in-by and twenty-four thousand feet out, with an antenna 26a-x, 28a-x every two thousand feet).

Tie-lines between the antennas 26a-x, 28a-x provide redundancy between the antenna networks 26, 28.

Figure 4:
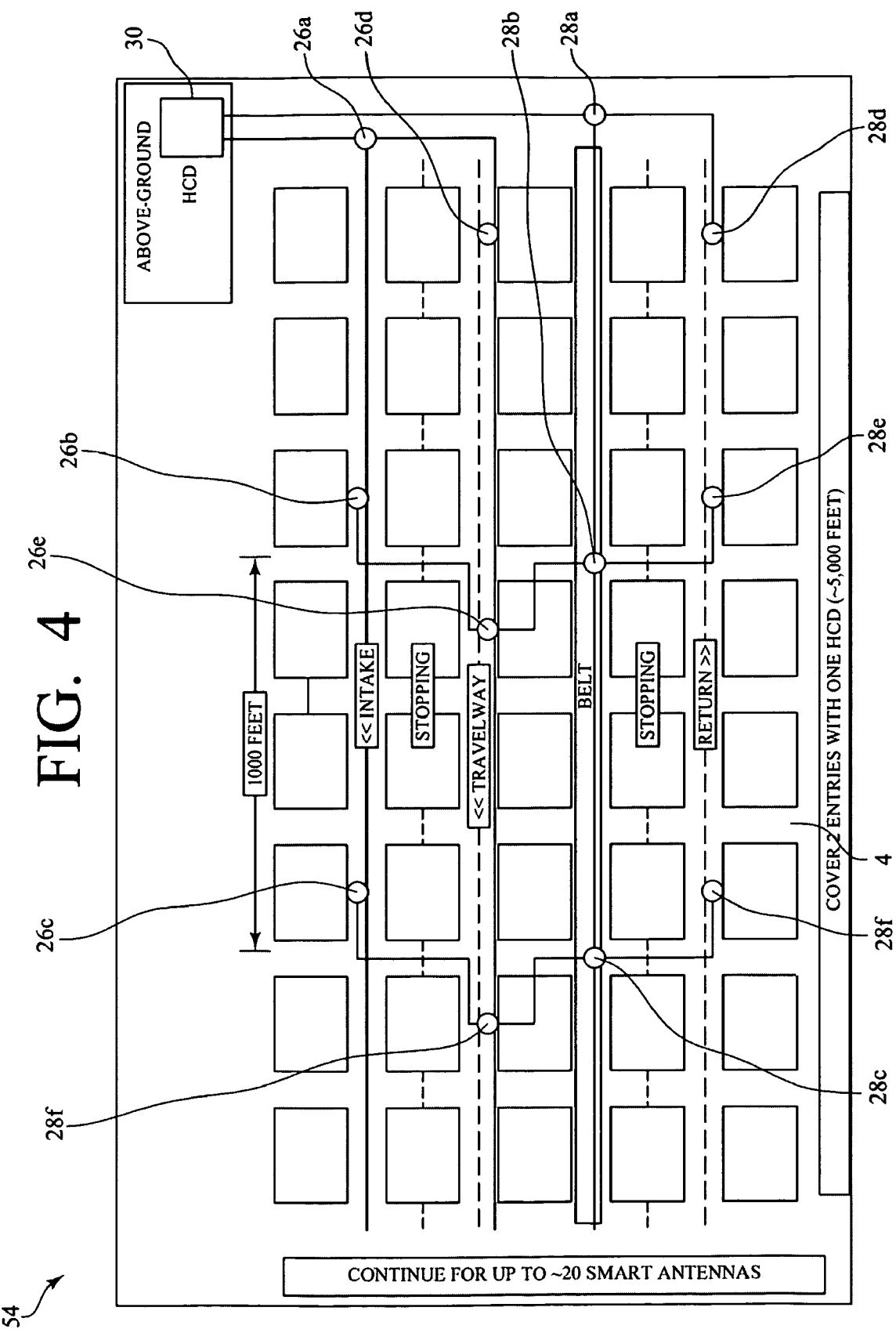

FIG. 4 shows a horizontal slice of a mine having a system 54 configured where four passageways or entries are covered by placing antennas 26a-x, 28a-x in multiple passageways. The antennas 26a-x, 28a-x in a passageway are placed intentionally not in a direct path through a stopping from the antennas 26a-x, 28a-x in a different passageway, to prevent tags 20, 22 from being picked up by antennas 26a-x, 28a-x in different passageways.

Figure 5:
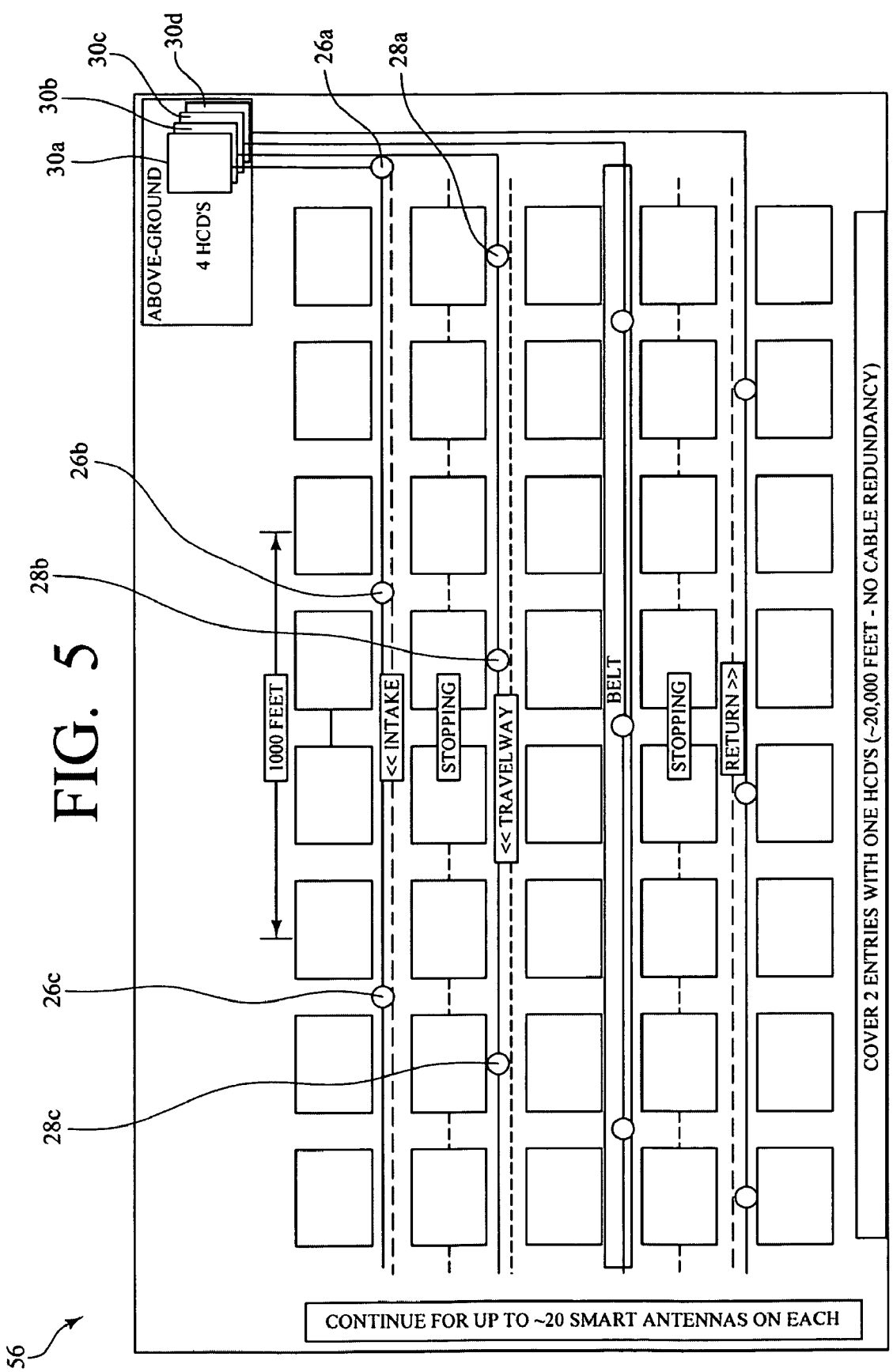

FIG. 5 shows a horizontal slice of a mine having a system 56 configured where four passageways or entries are covered by four hub cable drivers 30a-d. The antennas 26a-x, 28a-x are not configured in a redundant fashion.

B. Intrinsically Safe Personnel Tag and Equipment Tag

Figure 6:
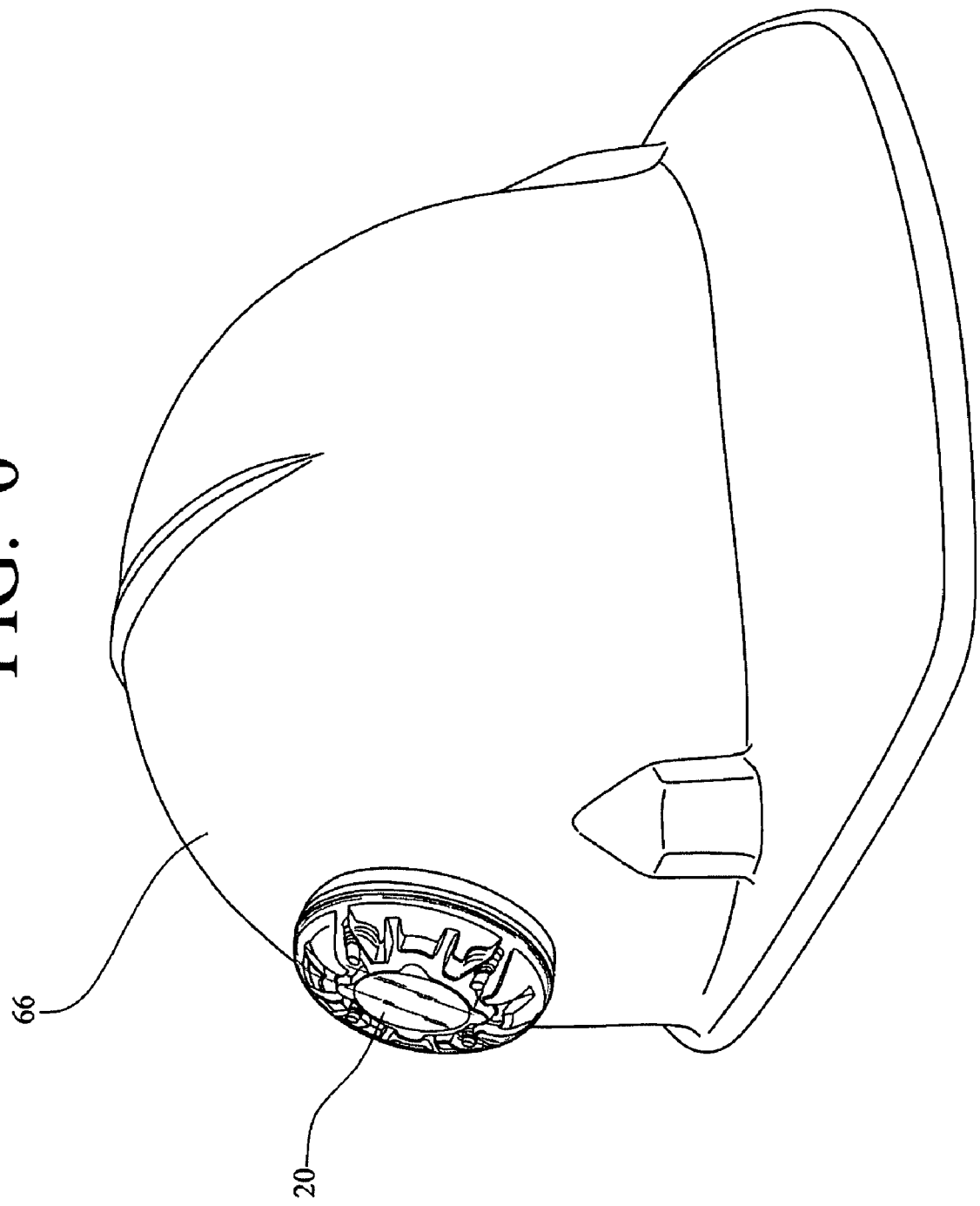
FIG. 6 is a perspective view of an exemplary intrinsically safe personnel tag attached to a representative hard hat.

FIG. 6 shows a representative intrinsically safe personnel tag 20 attached to a representative hard hat 66 as might be worn by a miner when working in a mine. The personnel tag 20 periodically transmits a digital radio signal containing a unique identification code identifying the personnel tag 20. The exemplary tag 20 is an "active" device, using a battery to increase the transmission range, transmits at an interval of 1-2 seconds, has a 200-800 foot range, uses a frequency of 433.92 MHz, and attaches to hard hat 66 with high-tech adhesive.

Similarly, the intrinsically safe equipment tag 22 might be attached to a piece of equipment located in the mine. The exemplary equipment tag 22 has an analog input and a digital input for receiving equipment status information, such as vehicle power and temperature. The equipment tag 22 periodically transmits a digital radio signal containing a unique identification code identifying the equipment tag 22 and the equipment status information.

Advantageously, as described in U.S. patent application Ser. No. 12/017,888, which has been incorporated herein by reference, the intrinsically safe personnel tag 20 and the intrinsically safe equipment tag 22 utilize a transceiver that is capable of receiving as well as transmitting.

C. Intrinsically Safe Hub Cable Driver

Figure 7:
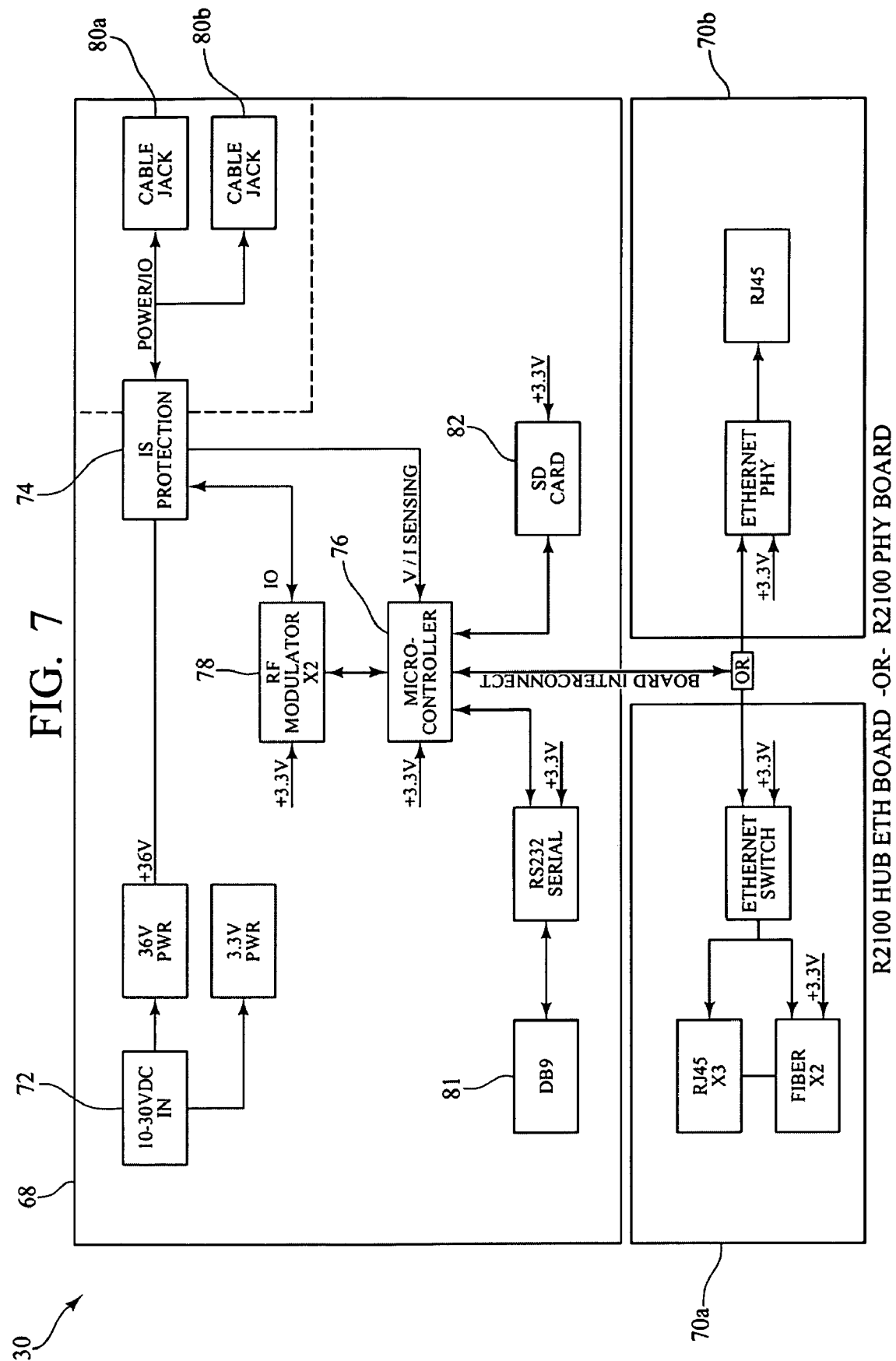
FIG. 7 is a functional block diagram of an exemplary hub cable driver of the exemplary system of FIG. 1.

FIG. 7 is a block diagram of the exemplary hub cable driver 30, including a main board and either a first Ethernet daughter board 70a or a second Ethernet daughter board 70b. As seen in FIG. 7, 10-30V DC is presented to the hub cable driver 30 from an external power supply 72. +3.3V DC and +36V DC are derived from the external power supply 72. The +3.3V DC is used to power local systems, shown in FIG. 7 and described below, and the +36V DC is passed through an IS protection block 74 before being presented to the antenna networks 26, 28 (FIG. 1).

Either the first Ethernet daughter board 70a or the second Ethernet daughter board 70b handle Ethernet connectivity to the hub cable driver 30. The first Ethernet daughter board 70a carries an Ethernet switch and multiple RJ45 and Fiber ports. The second Ethernet daughter board 70b carries a single RJ45 port. Both the first Ethernet daughter board 70a and the second Ethernet daughter board 70b are powered from the local +3.3V supply.

Data packets are routed from one of the first Ethernet daughter board 70a or the second Ethernet daughter board 70b through a hub microcontroller 76 for interpretation before passing onto a RF modulation chip set 78. The modulated data is power limited by the IS protection block 74 before being coupled to cable jacks 80a, 80b, preferably RG11 coaxial cable jacks.

Similarly, received data from the antenna networks 26, 28 (FIG. 1) follows the reverse path and flows out from one of the first Ethernet daughter board 70a or the second Ethernet daughter board 70b over the Ethernet network. A DB9 serial port 81 and a memory card 82, preferably a SD memory card, are provided to allow for communicating with the hub microcontroller 76 directly. The hub microcontroller 76 receives voltage and current levels from the IS protection block 74, and opens a switch (not shown) (e.g., a small output relay (2 A 30V DC)) to signal a system fault. Additionally, if the hub microcontroller 76 detects a fault, the hub microcontroller 76 disconnects power from either of the two cable jacks 80a, 80b to provide intrinsic safety to the antenna networks 26, 28 (FIG. 1).

As seen in FIG. 1, the hub cable driver 30 is located outside of the hazardous environment 48. A port 31a of the hub cable driver 30 is connected by a first cable to the first group of connected antennas 26a-26i. The port 31b of the hub cable driver 30 is connected by a second cable to the second group of connected antennas 28a-28i. The hub cable driver 30 is configured to: provide power to the antennas 26a-26i, 28a-28i over the cables; receive the signals from the antennas 26a-26i, 28a-28i over the cables; and transmit the signals to the server 36 via the data switch 34. The hub cable driver 30 is communicatively coupled to the data switch 34, such as by Ethernet protocol communications.

Advantageously, the mesh-like connection configuration between the hub cable driver 30 and the antennas 26a-26i, 28a-28i of the exemplary system 10 provides multiple levels of redundancy, as each antenna 26a-26i, 28a-28i has up to four independent paths for receiving power and for transmitting data to the server 36. For example, if there were a communication disruption at a location between the antennas 26a, 26b caused by an event in the hazardous environment (e.g., a mine), all of the antennas 26a-26i, 28a-28i would still be operably connected to the hub cable driver 30.

D. Intrinsically Safe Antennas

As seen in FIG. 1, the first set of intrinsically safe antennas 26a-26i and the second set of intrinsically safe antennas 28a-28i are positioned at known locations in the hazardous environment 48 and are connected to each other or to the first port 31a or the second port 31b of the hub 30, respectively, by communication cable. The antennas 26a-26i and 28a-28i are configured to receive the digital radio signals from the personnel tag 20 and the equipment tag 22, when the tags 20, 22 are in range of the antennas 26a-26i, 28a-28i. Each antenna 26a-26i, 28a-28i is further configured to transmit a signal over the communication cable containing a unique identification code identifying the respective antenna 26a-26i, 28a-28i and to relay to the hub cable driver 30 which ever of the unique identification codes it has received for the personnel tag 20 and the equipment tag 22, along with any respective equipment status information. Each antenna 26a-26i, 28a-28i also has a plurality of ports to connect with the hub cable driver 30 or other antennas.

Figure 8:
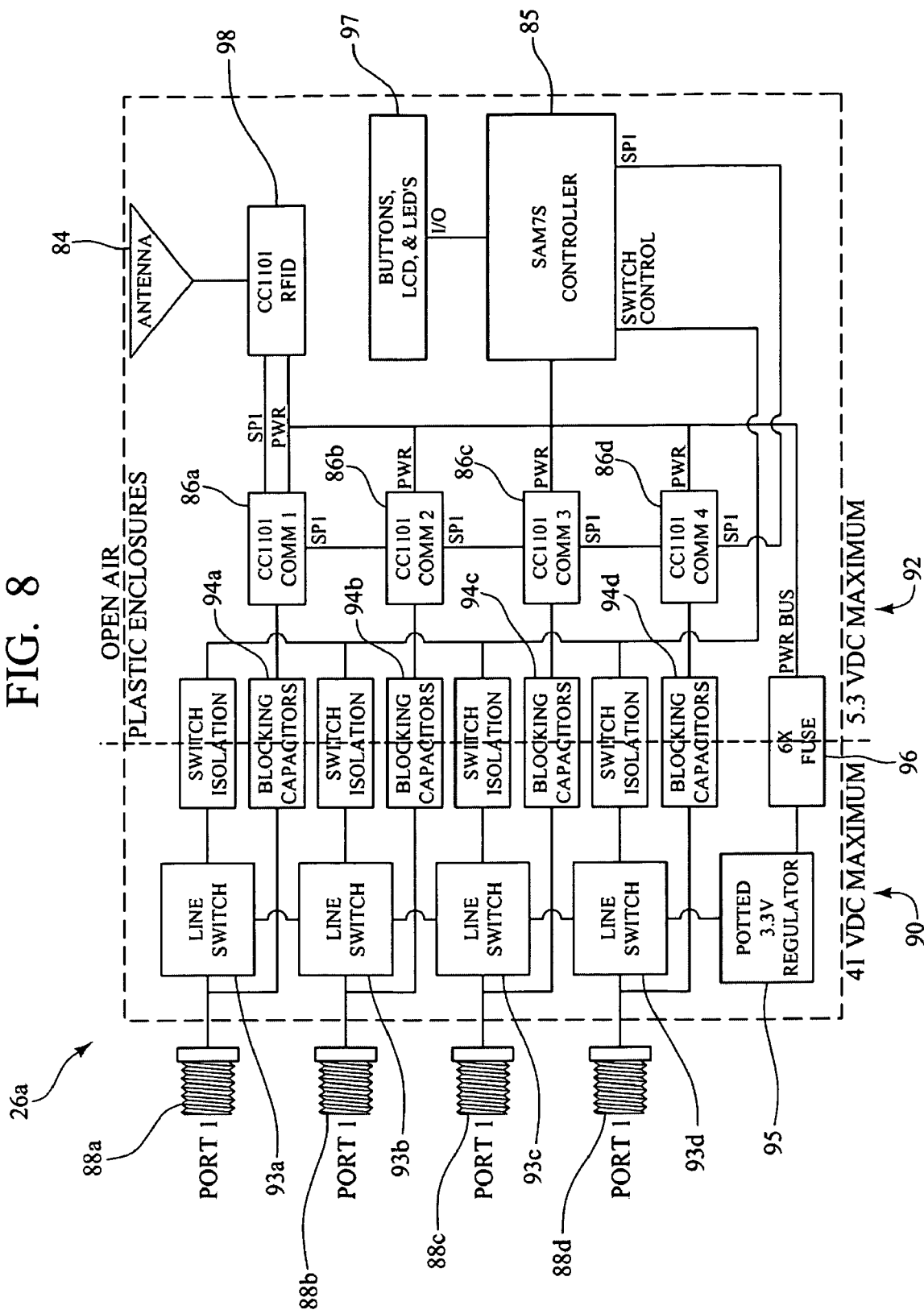
FIG. 8 is a functional block diagram of an exemplary intrinsically safe antenna of the exemplary system of FIG. 1.

FIG. 8 shows a functional block diagram of an exemplary antenna 26*a* including an on-board antenna 84, an antenna microcontroller 85, a plurality of RF modulators 86*a*-86*d*, and ports 88*a*-88*d*.

The ports 88*a*-88*d* remain disconnected until a command is issued to power them up in turn. In this way, discrete cable segments can be powered up and tested for proper functioning, and damaged or shorted segments will be automatically avoided. Thus, if a communication cable or a component fails, the system 10 reconfigures itself to provide alternate power and communications paths.

Returning to FIG. 1, multiple antennas 26*a*-26*i*, 28*a*-28*i* are installed at regular intervals throughout a hazardous environment 48, and are redundantly connected to each other. This "mesh network" structure derives its power from a single hub cable driver 30 that has been deployed in free air. The hub cable driver 30 is also responsible for exchanging data with the Ethernet network. Each antenna 26*a*-26*i*, 28*a*-28*i* is intrinsically safe, and the installation may be extended until the limit of available power from the hub cable driver 30 is reached. Each antenna 26*a*-26*i*, 28*a*-28*i* can connect with a plurality other antennas 26*a*-26*i*, 28*a*-28*i* over independent communication cables.

After the antenna networks 26, 28 are fully initialized, reception of information from the intrinsically safe personnel tags 20 and the intrinsically safe equipment tags will commence. In the exemplary system 10, data packets are received with the on-board antenna 84, and are relayed to each port 88*a*-88*d* separately. Each port has its own RF modulator 86*a*-86*d*. Any unused ports 88*a*-88*d* may be deprecated to conserve energy. In the event that signals from one or more of the tags 20, 22 are received by more than one antenna, 26*a*-26*i*, 28*a*-28*i*, the antennas 26*a*-26*i*, 28*a*-28*i* determine the strength of the signal received from each of the tags 20, 22 in order to deduce the closest of the antennas 26*a*-26*i*, 28*a*-28*i* to each tag 20, 22.

Figure 9:
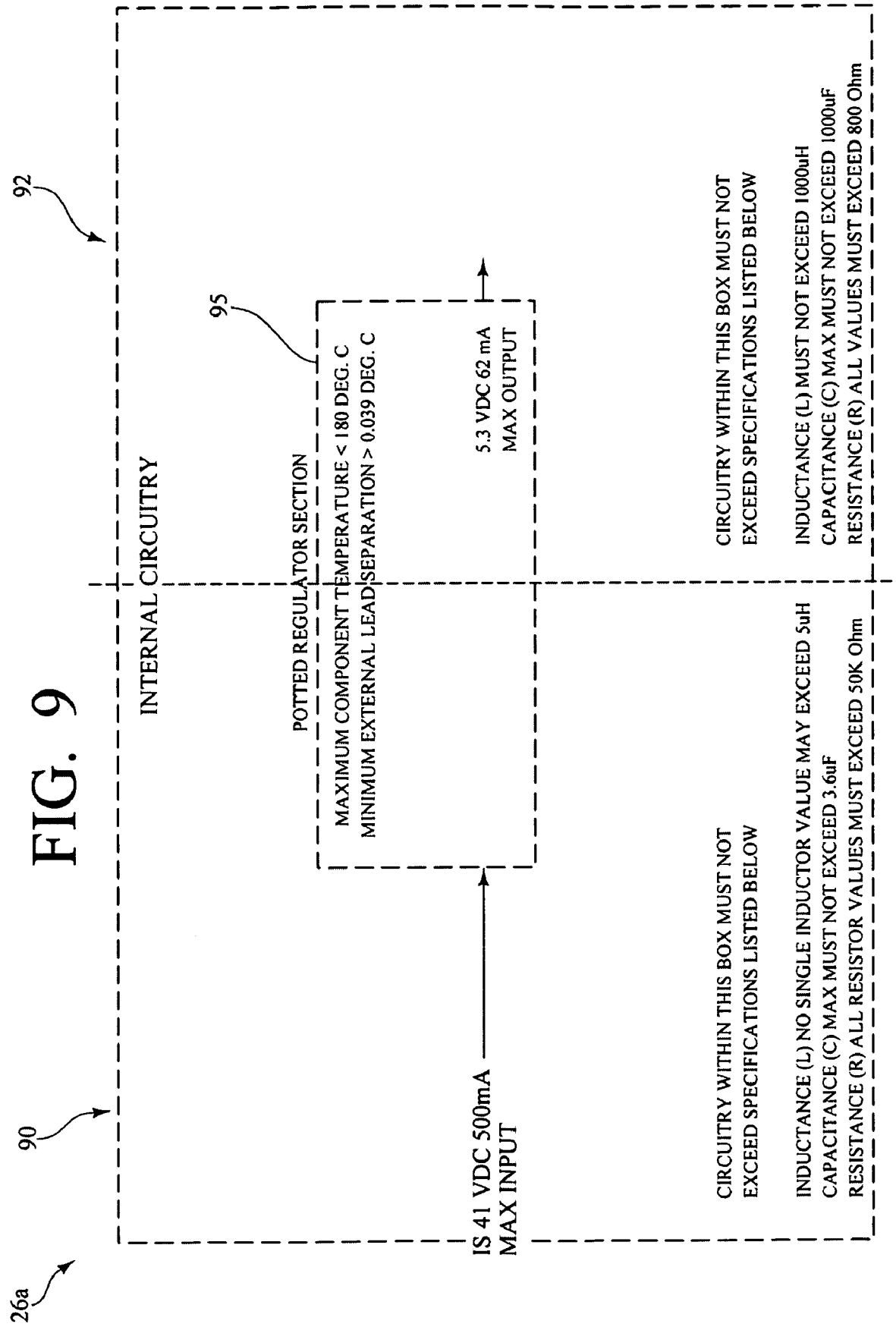
FIG. 9 is a functional block diagram of first and second voltage domains of the exemplary intrinsically safe antenna of FIG. 8.

FIG. 9 shows the exemplary antenna 26*a* having a first voltage domain 90 and a second voltage domain 92, to maximize the intrinsic safety of the assembly.

The first domain 90 is that of the IS powered network. 41V at 500 mA may be accepted at any of the ports 88*a*-88*d* (FIG. 8).

Returning to FIG. 8, line switch components 93*a*-93*d* and RF coupling capacitors 94*a*-94*d* (FIG. 8) will be exposed to this voltage as well. A potted switching regulator 95 takes this voltage and limits it to create the second voltage domain 92 (FIG. 9).

The second voltage domain 92 (FIG. 9) is the local 3.3V DC that powers each RF modulator 86*a*-86*d*, and the antenna microcontroller 85. The input of the potted switching regulator 95 is fused to 62 mA, and the output is voltage limited by redundant 5.1V Zeners (not shown) to 5.36V. Additionally, each of the RF modulators 86*a*-86*d*, and the antenna microprocessor 85 have their own 10V infallible 62 mA fuses 96.

To keep power efficiency high, and the mesh stable, the potted switching regulator 95 accepts the IS 41V DC, and steps this down to +3.3V DC for all local communications and control operations. The potted switching regulator 95 is potted to exclude atmosphere, and soldered to the board so it is not user replaceable. The protective elements of the assembly are targeted at isolating the on-board capacitance and inductance that the regulator needs for its operation. All protection elements are potted on-board with the potted switching regulator 95, and are 60V Infallible.

To eliminate a common point failure, the RF sections are fused individually, immediately adjacent to the output of the regulator 95. The fuses 96 are 10V Infallible, 62 mA max, and non-user replaceable.

Figure 10:
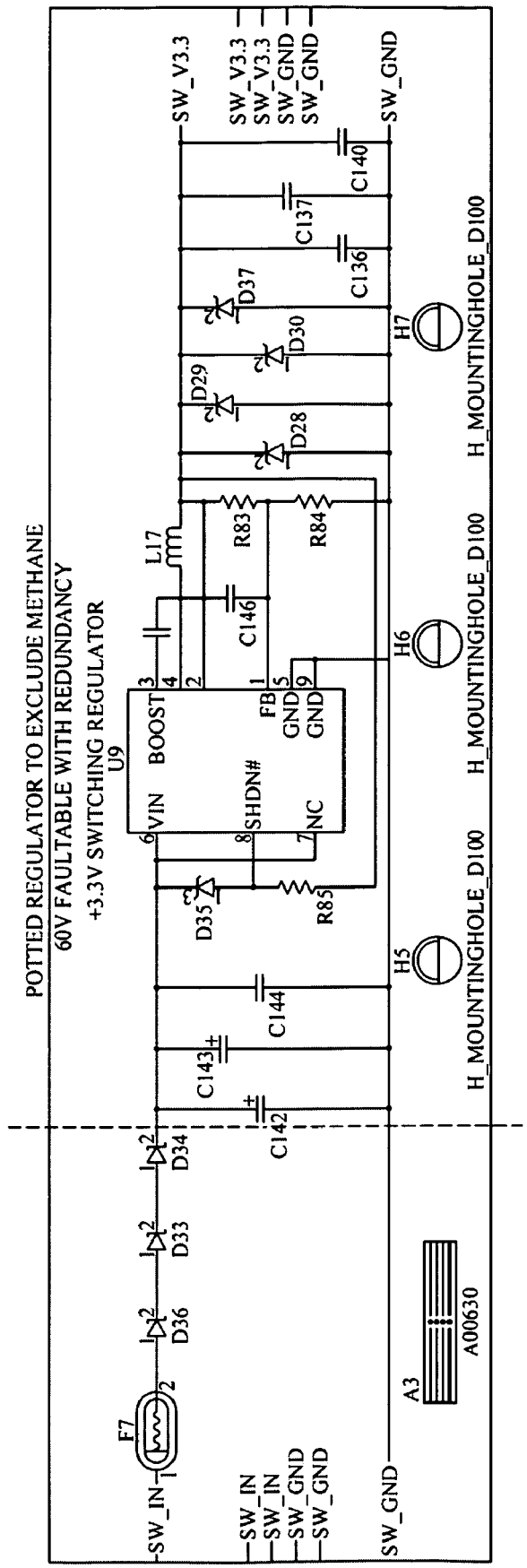
FIG. 10 is a circuit diagram of an exemplary potted switching regulator of the exemplary intrinsically safe antenna of FIG. 8.

FIG. 10 shows the potted switching regulator 95. A one time, non user replaceable fuse F7 limits the maximum input current to 62 mA (from the IS 41V DC, 500 mA Hub source.) This passes through redundant diodes (D36, D33 & D34) in order to separate the regulator input capacitance (C142, C143, & C144) from back feeding the input. U9 is a standard buck converter with an internal switching Feet, and a single output inductor L17. The output capacitors are C136, C137, & C140. The normal output of 3.3V is set by feedback from R83, and R84. Any over voltage fault will be limited by redundant 5.1V Zeners D28, D29, & D30 which set an effective maximum of 5.36V.

Figure 11:
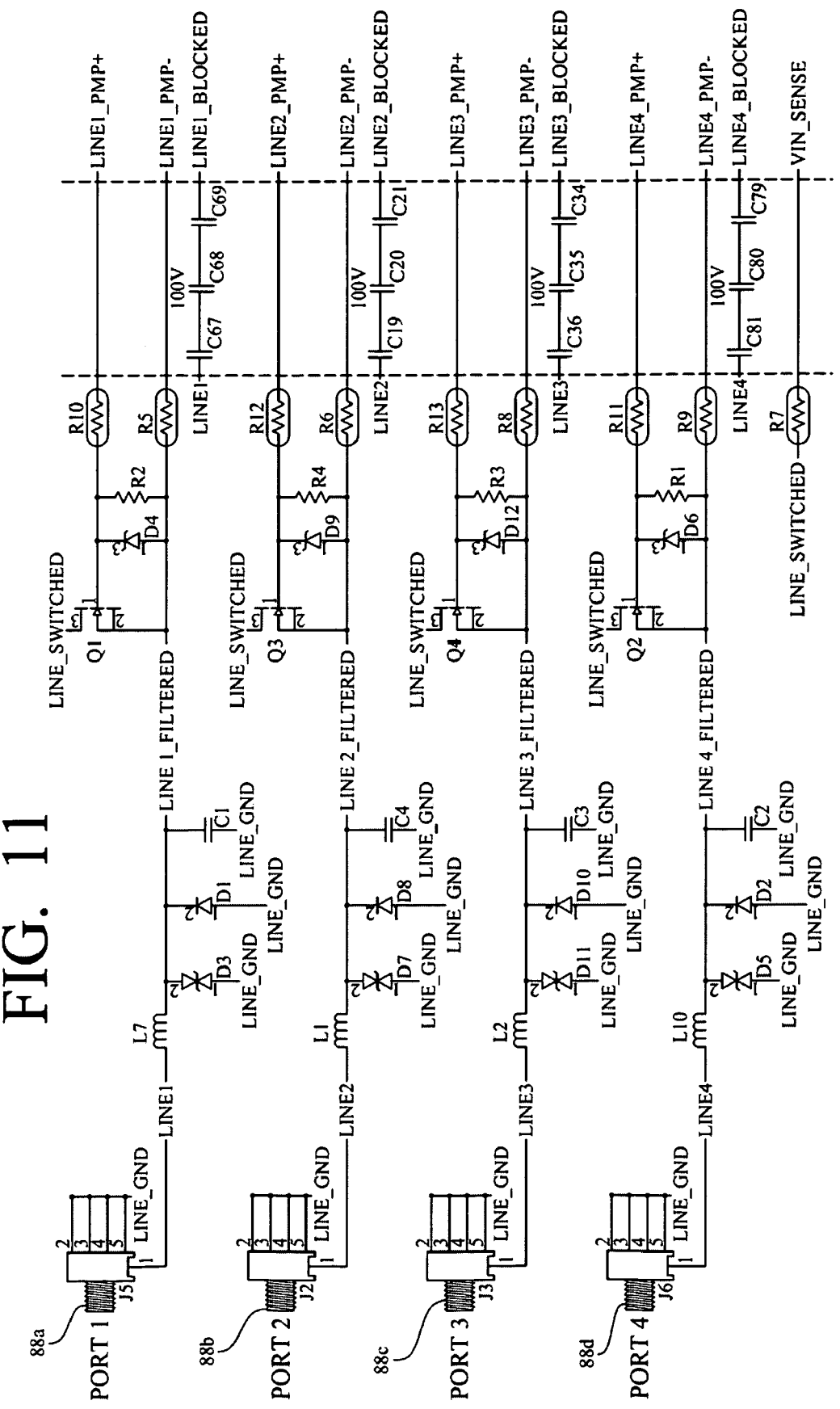
FIG. 11 is a circuit diagram of an exemplary line switch input section of the exemplary intrinsically safe antenna of FIG. 8.

Turning now to FIG. 11, within the first voltage domain 90 (i.e., the 41 volt domain) all isolation components are two fault redundant or 60V infallible. The four ports 88*a*-88*d* are identical in function, and IS 41V DC, 500 mA power may be accepted from any of them. Power from each port 88*a*-88*d* is first RF filtered (L7, L1, L2, L10), before meeting its own line switch MOSFET (Q1, Q3, Q4, Q2). Simultaneously, any RF communication is shunted through redundant DC blocking capacitors (C67/C68/C69, C19/C20/C21, C36/C35/C34, C81/C80/C79). The Voltage Sense line has a high value series resistor R7 to limit its current. Similarly the MOSFET Control lines have a high series resistance (R5/R10, R6/R12, R8/R13, R9/R11) for current limitation. The MOSFET intrinsic body diode provides power for the local 3.3V regulator, while blocking power from the un-initialized ports.

Returning now to FIG. 8, all other components are in the second voltage domain 92. The RF modulators 86*a*-86*b* (preferably CC1101 RFID chips) are used to communicate to each port 88*a*-88*d* individually. The antenna microcontroller 85 is preferably a SAM 7S microcontroller. The antenna microcontroller 85 is responsible for receiving initialization commands from the hub cable driver 30 and switching on each port 88*a*-88*d* with a set of low current diode pumps (not shown). The antenna microcontroller 85 monitors the supplied voltage for droop that signals a bad segment. Temperature data is collected by a temperature sensor (not shown). A user interface 97 is comprised of buttons, LEDs and an LCD display. A data transceiver 98 collects data from the tags 20, 22 and passes the data to the antenna microcontroller 85 for dispersal back to the hub cable driver.

E. Physical Descriptions

Returning now to FIG. 1, the circuitry of the exemplary hub cable driver 30 is preferably installed in a metal case. The housing need not be explosion proof or dust proof. All boards are preferably conformally coated. The circuitry of the exemplary antennas 26*a*-26*i*, 28*a*-28*i* is preferably installed in a durable plastic housing that is sealed for environmental reasons; however, no claim of dust proof is made regarding the housing. The housing need not be explosion proof or dust proof. The circuitry of the exemplary antennas 26*a*-26*i*, 28*a*-28*i* is intrinsically safe. All boards are preferably conformally coated.

F. Mesh Network Safety

To maintain intrinsic safety and facilitate quick inspection, the following restrictions should be observed when deploying the exemplary system 10:

1. Only one hub cable driver 30 may be used per antenna network 26, 28 combination.

2. Each communication cable segment whether between a hub cable driver 30 and an antenna (e.g. 26a-26i, 28a-28i), or between antennas (e.g. 26a-26i, 28a-28i), should be less than a predetermined length determined by the communication cable characteristics (e.g. 4,000 ft in length for RG11 coaxial cable).

3. A predetermined number of antennas (e.g. 26a-26i, 28a-28i) may be used per antenna network 26, 28 combination determined by the communication cable characteristics. For example, a limit of 50 antennas limits the maximum number of deployed cable segments. If four segments are added for the first node, and three segments are added for each additional node, then the maximal segment population must be, using the preferable characteristics of RG11 coaxial cable, 1*4+49*3=151. 151*4 K feet producing a worst case network of 604K feet. Taking into account a 16 pF/ft cable specification reveals a worst case 9.6 uF distributed across the entire network. Given the systems 40V DC Maximum, and using segment resistance figures of 75 Ohms AC, and 18.4 Ohms DC, the maximal network can be seen to present no ignition hazards.

It should be noted that these maxims are meant to ease safety inspections, but are beyond the useful capability of the exemplary system 10. Antenna loading, signal strength, and cable resistance will automatically limit the useful network size below these levels. Therefore an easy check of continuing safety is system functionality. Simply, if the antennas 26a-26i, 28a-28i are powered, and communicating, then the network is healthy.

G. Optional Atmospheric Sensors

Optionally, the system 10 can include intrinsically safe atmospheric sensors, either wired or wireless. Intrinsically safe wireless atmospheric sensors are positioned at known locations in the underground mine, and periodically transmit a digital radio signal using the same radio technology described above with respect to the personnel tag 20 and the equipment tag 22. The digital radio signal contains a unique identification code identifying the wireless atmospheric sensor and a gas level reading value detected by the wireless atmospheric sensor.

Advantageously, the wireless atmospheric sensors simplify the calibration process, by allowing a wireless atmospheric sensor in need of calibration to be swapped with a calibrated wireless atmospheric sensor. The wireless atmospheric sensor in need of calibration can then be calibrated at a central location with other wireless atmospheric sensors and in a more controlled (and comfortable) environment than in the mine. Additionally, the wireless atmospheric sensor contains a rechargeable battery that is capable of powering the wireless atmospheric sensor between calibrations. Thus, the rechargeable battery can be recharged following calibration, and the wireless atmospheric sensor will be calibrated, charged, and ready to be swapped with another wireless atmospheric sensor that is in need of calibration and recharging.

Intrinsically safe wired atmospheric sensors are also positioned at known locations in the underground mine. The wired atmospheric sensors are preferably serially connected by communication cable to the mesh antenna networks 26, 28. Each of the wired atmospheric sensors is configured to: receive power from the hub cable driver 30 via the communication cable; sense a gas level in an atmosphere at the respective wired atmospheric sensor; and periodically transmit a signal to hub cable driver 30 over the communication cable. The transmitted signal contains a unique identification code identifying the respective atmospheric sensor and a gas level reading value indicating the sensed gas level. The respective hub cable driver 30 transmits the received signals to the server 36 via the data switch 34. The server 36 stores the data in the data storage 38, and the workstation 40 uses the data in the data storage 38 to track the gas level at each of the wired atmospheric sensors.

H. Data Switch

The data switch 34 is a standard data switch such as are well known in art, and serves to connect the hub 30 to the server 36 using a predetermined communication protocol, such as Ethernet.

I. Server/Data Storage

The server 36 receives the signals from the hub 30, and stores data contained in the received signals in the data storage 38.

J. Workstation

The workstation 40 is configured to retrieve the stored data from the data storage 38 and use the stored data to track the person and the piece of mining equipment, using software as described below.

K. Software

Figure 12:
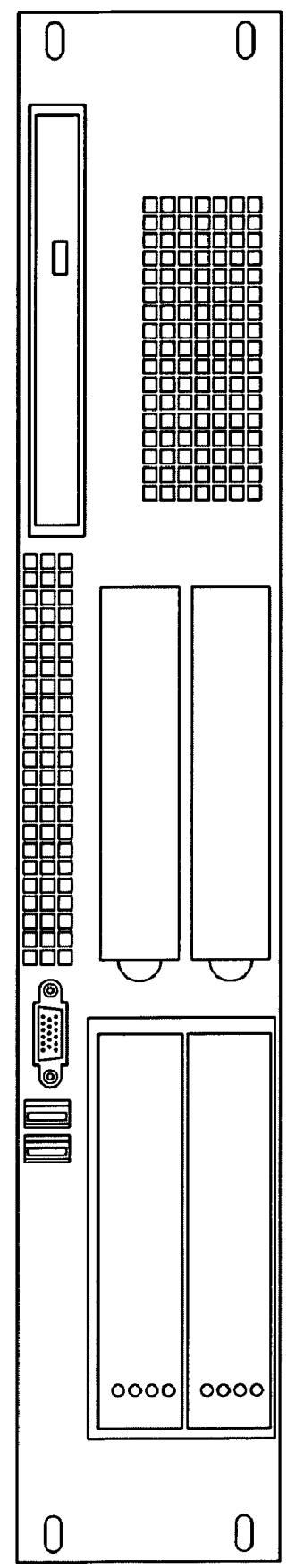
FIG. 12 is a front plan view of an exemplary server of the exemplary system of FIG. 1.

FIG. 12 shows a representative server 36. Preferably, the server 36 has redundant power supplies, disks, fans and Ethernet ports. Also, the server 36 preferably has a remote administration card for allowing remote administration of the server 36. The server 36 executes several program modules which will be described below, implementing the steps of an exemplary method for tracking miners and equipment in mines using the tags 20, 22 and antennas 26a-26i, 28a-28i described above.

Figure 13:
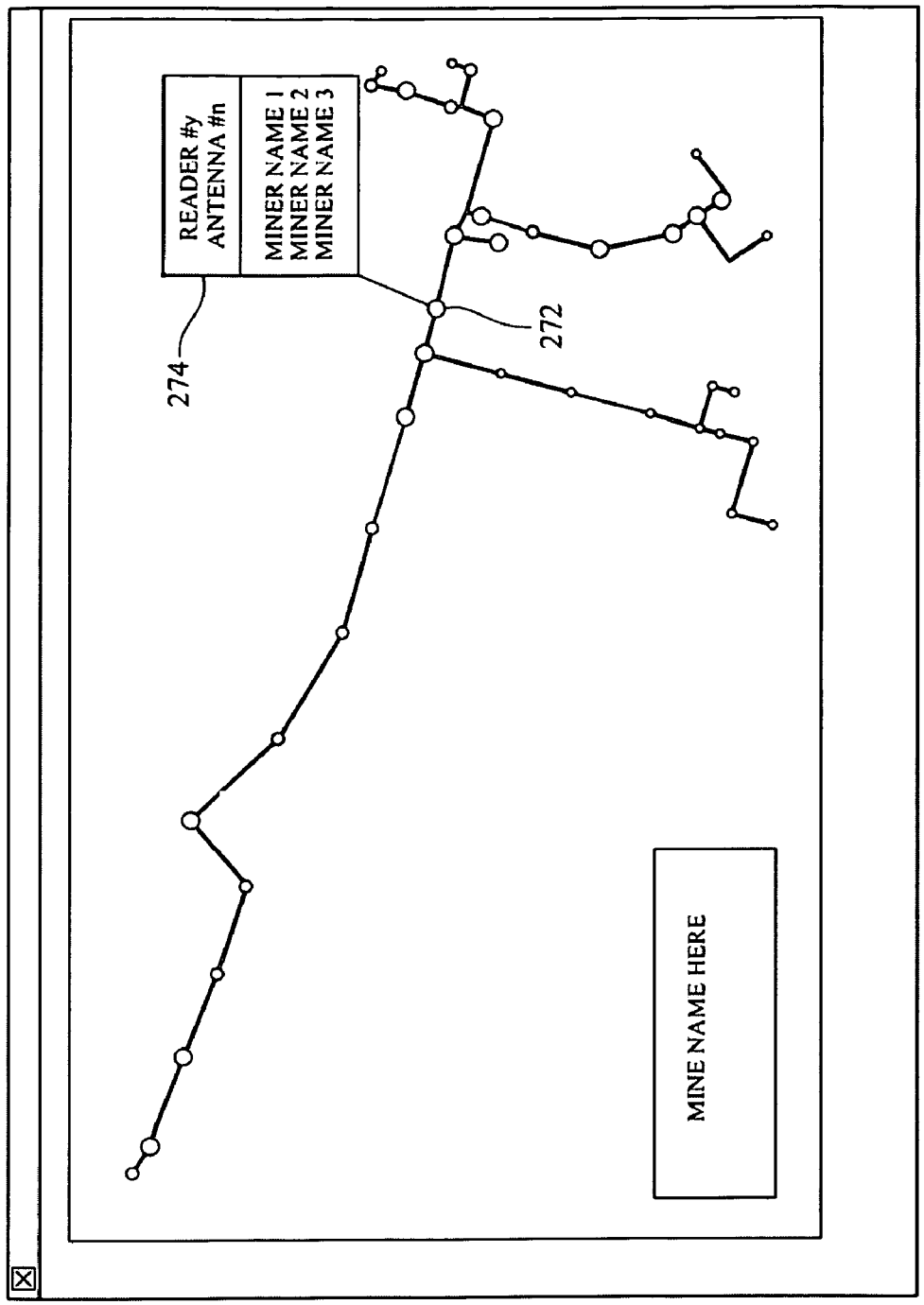
FIG. 13 is a representative screen shot of a map display generated for display on a display workstation of the exemplary system of FIG. 1.
Figure 14:
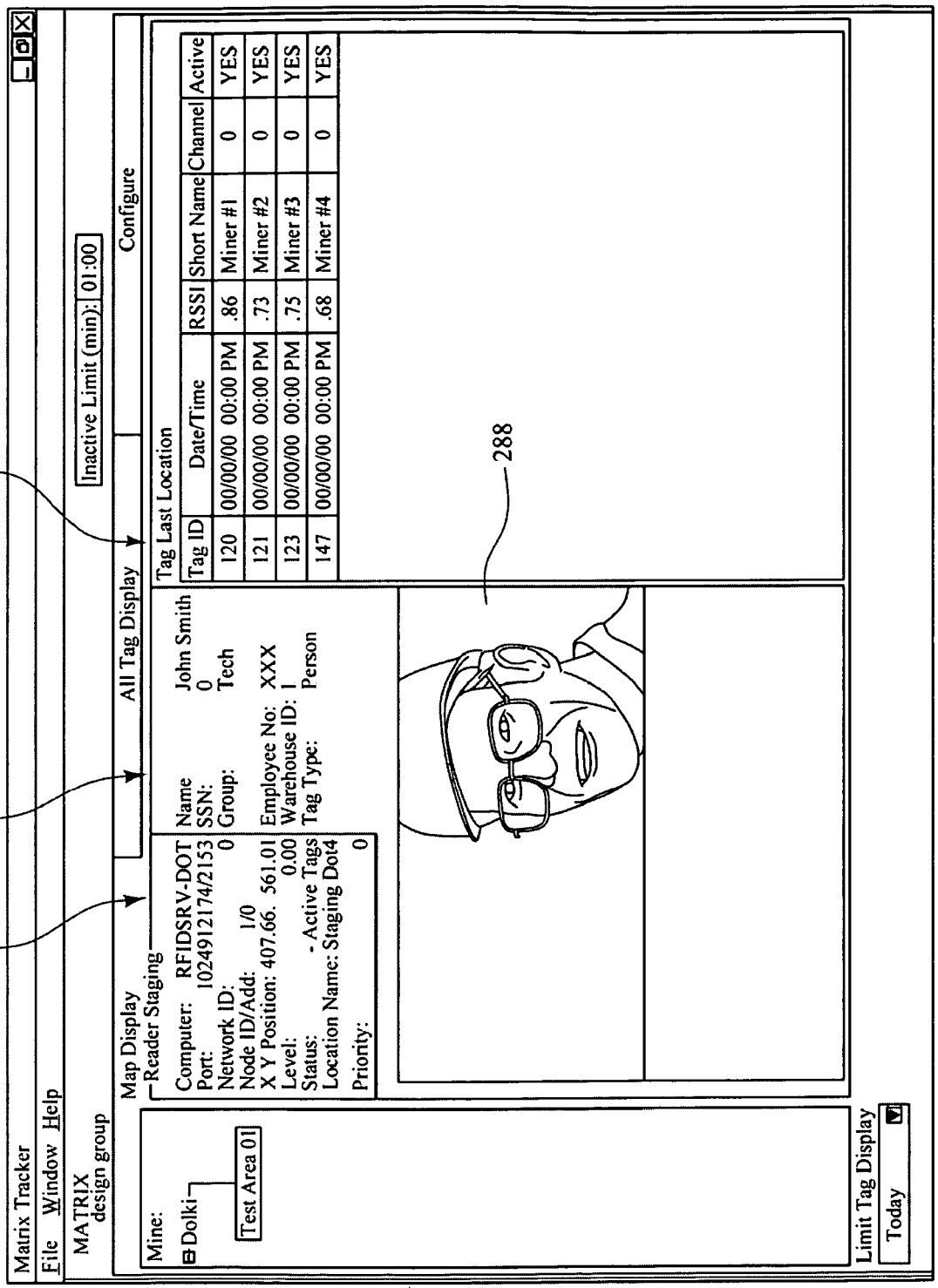
FIG. 14 is a representative screen shot of a data display generated for display on a display workstation of the exemplary system of FIG. 1.
Figure 15:
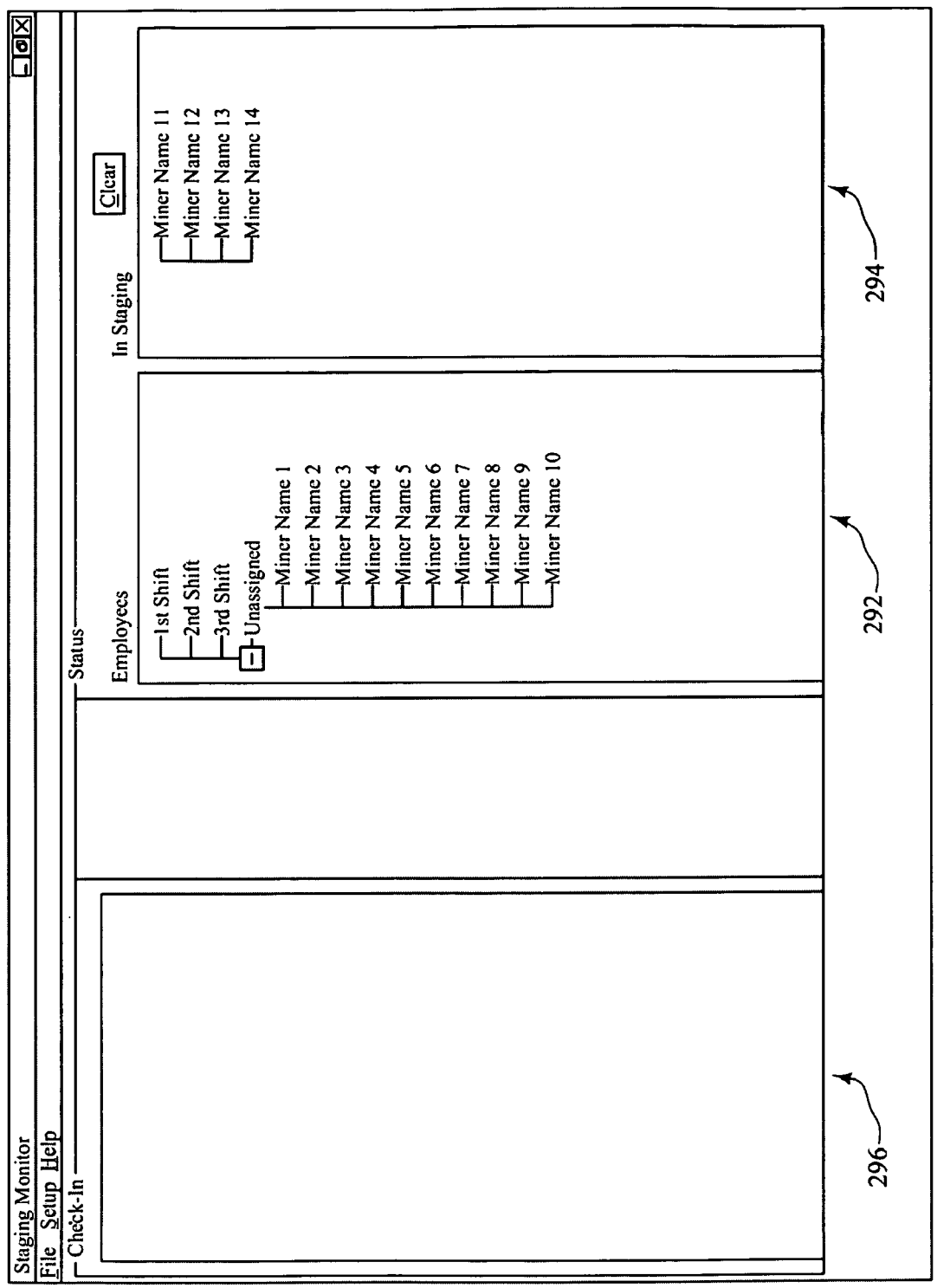
FIG. 15 is a representative screen shot of a staging monitor display generated for display on a display workstation of the exemplary system of FIG. 1.

FIG. 13-FIG. 15 show representative screen shots that the program modules may generate for display on a display workstation 40 (FIG. 1). The display workstation 40 is preferably in communication with the server 36 via an Ethernet connection.

FIG. 13 is an exemplary map display 270, for identification of miners, units, equipment, or equipment groups. For instance, a node 272 on the map display 270 represents a antenna 26a-26i, 28a-28i (FIG. 1). By selecting the node 272, a window 274 appears on the map display 270 identifying the antenna 26a-26i, 28a-28i selected, and listing the miners or equipment (i.e. tags 20, 22 (FIG. 1)) that are currently present at that location. The map display 270 may have zoom capabilities.

FIG. 14 is an exemplary data display 280, which displays details of antennas 26a-26i, 28a-28i (FIG. 1) and tags 20, 22 (FIG. 1), and can be sorted by tag 20, 22, or antenna 26a-26i, 28a-28i. The data display 280 includes an antenna identification/status area 282, a selected tag details area 284, and a list 286 of all tags that are present in the vicinity of a selected antenna 26a-26i, 28a-28i. The selected tag details area 284 may also include a photograph 288 of the miner or piece of equipment associated with a tag 20, 22.

FIG. 15 is an exemplary staging monitor display 290, which is used to display miners in staging areas and verify tag operation. The staging monitor display 290 includes a first area 292 for identifying personnel tags 20 for miners that have not checked-in; a second area 294 for identifying miners tags 20 that have checked-in; and a third area 296 for identifying personnel tags 20 for miners that are present at a staging area antenna.

FIG. 16-FIG. 22 illustrate an exemplary software system 100 for tracking miners and equipment in mines using the exemplary tags (e.g., 20, 22) and antennas (e.g., 26a-26i, 28a-28i) described above. As such, references to tags 20, 22, and antennas 26a-26i, 28a-28i in the following description shall be understood to refer to the exemplary tags (e.g., 20, 22), and antennas (e.g. 26a-26i, 28a-28i) described above.

Figure 16:
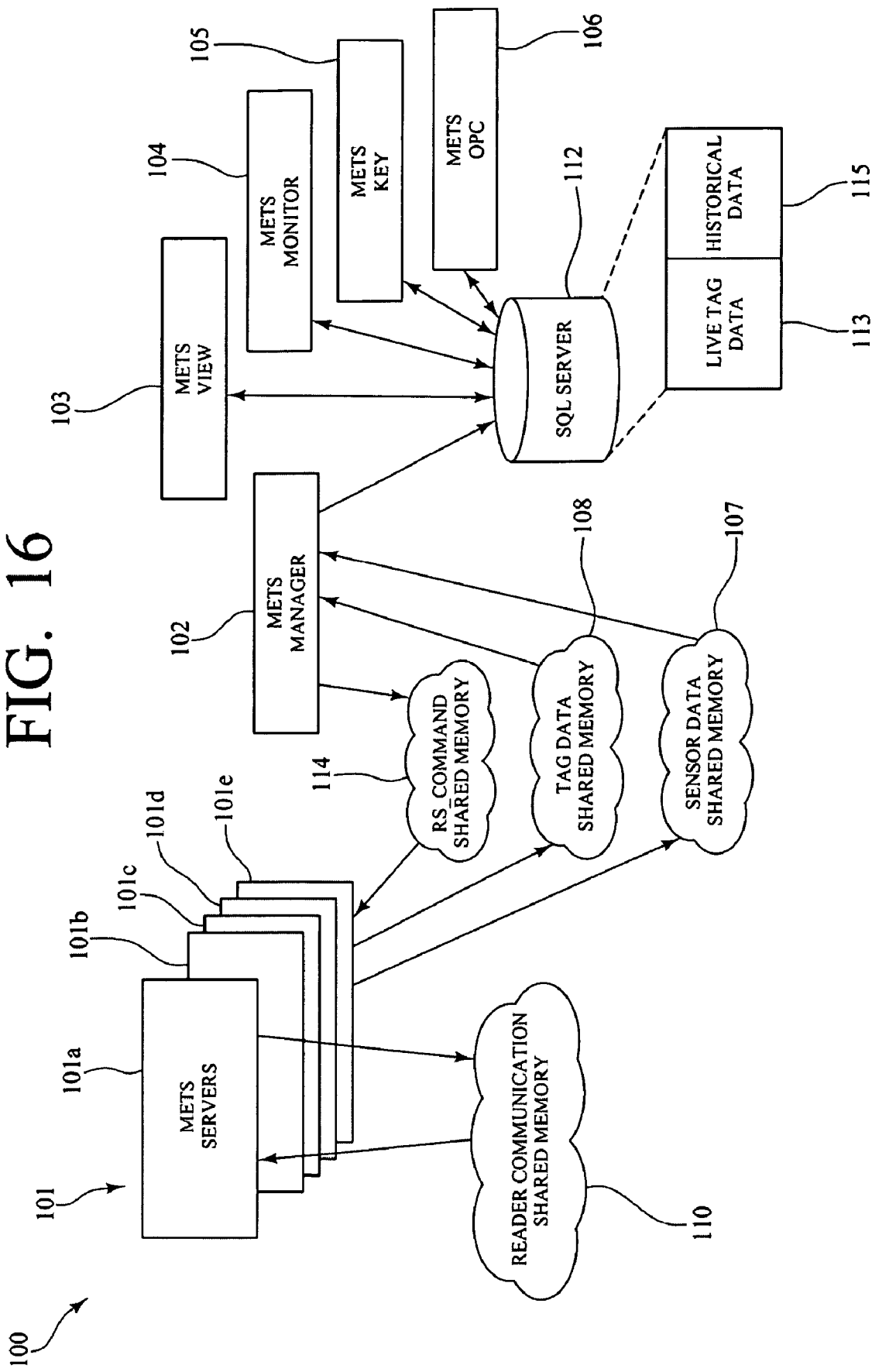
FIG. 16 is an architecture overview chart of an exemplary software system of the exemplary system of FIG. 1.

FIG. 16 is an architecture overview chart of the exemplary software system 100 comprising software program modules including a server module 101, a manager module 102, a view module 103, a monitor module 104, a key module 105, an OPC module 106, a Sensor Data Shared Memory 107, a Tag Data Shared Memory 108, a Reader Communication Shared Memory 110, a server database 112, and a RS Command Shared Memory 114.

The server module 101 includes multiple server objects 101a-101e running concurrently. Each running server object 101a-101e handles a hub cable driver 30 and antennas (e.g., 26a-26i, 28a-28i). The purpose of the server module 101 is to receive information from the hub cable driver 30 and antennas (e.g., 26a-26i, 28a-28i) and pass that information to the manager module 102. That communication is done through the Tag Data Shared Memory 108 within a memory component of server 36.

In addition, the server objects 101a-101e communicate with one another through the Reader Communication Shared Memory 110 where digital radio messages are stored. The server module 101 filters digital radio messages received by more than one antenna (e.g., 26a-26i, 28a-28i) at a time, and stores only the digital radio message having the strongest signal and the location of the antenna receiving that signal to the Tag Data Shared Memory 108. In this manner, the server module 101 determines the location of the tag 20, 22 by determining the location of the closest antenna (e.g., 26a-26i, 28a-28i) (i.e. the antenna receiving the strongest signal).

Sensor data is stored to the sensor data shared memory 107.

The manager module 102 provides several functions. The primary function of the manager module 102 is to read the shared memory of the Tag Data Shared Memory 108 and the Sensor Data Shared Memory 107, and translate that information into server records on the server database 112. In addition, the manager module 102 sends commands to the server module 101 through the RS Command Shared Memory 114. In addition, the manager module 102 maintains the definitions of the hub cable driver 30 and all of the antennas (e.g., 26a-26i, 28a-28i) that are used in the system 10. These definitions include items such as the Ethernet address and port information that is specific to the reader hardware.

Within the server database 112, the manager module 102 maintains a Live Tag Data Table 113 and a Historical Data Table 115. The Live Tag Data Table 113 contains the current data as it is read from the hub cable driver 30 and each of the antennas (e.g., 26a-26i, 28a-28i) that are attached to the system 10. The manager module 102 stores historical tracking tag data in the Historical Data Table 115 to maintain a location history for each tracking tag 20, 22.

The view module 103 provides two primary functions with respect to the server database 112. One function provides a visual overview of the mine that includes multiple levels of maps and displays of locations of tracking tags 20, 22 on the maps. The other function provides a view of the tracking data in a tabular format, both for the Live Tag Data Table 113 and for the Historical Data Table 115. In addition, the display module 103 is also able to produce ad hoc and predefined reports from data in the Live Tag Data Table 113 and the Historical Data Table 115.

The view module 103 also provides a number of other functions. One function is allowing users to edit, with respect to the maps, position information for the antennas (e.g., 26a-26i, 28a-28i) as they are added, modified, or removed from the system 10. Another function is selectively choosing whether to filter data for the tags 20, 22, such as just for the current shift or active tags as they are being read into the Live Tag Data Table 113. The display module 103 also provides the ability to locate tracking tags 20, 22, both to the current location as well as to the last place where the tracking tag 20, 22 was read, and then to display those locations visually on a map and in a table. Another function that the display module 103 provides is the ability to edit the details associated with a particular tag. These details would include items such as the employee number, warehouse IDs, and a photograph of the individual or of the asset in the database.

The monitor module 104 provides e-mail support for database reports and status notifications. The monitor module 104 also provides a method to clear database tables, cleanup database routines, and monitor the operation of the manager module 102.

The key module 105 provides a way to control licensing based on the number of antennas (e.g., 26a-26i, 28a-28i) and tags 20, 22 permitted, and generates keys for remote systems based on system parameters at the remote system (allows license changes via telephone support).

The OPC module 106 allows OPC access to external clients, such as a connection to another server that provides atmospheric monitoring services.

Figure 17:
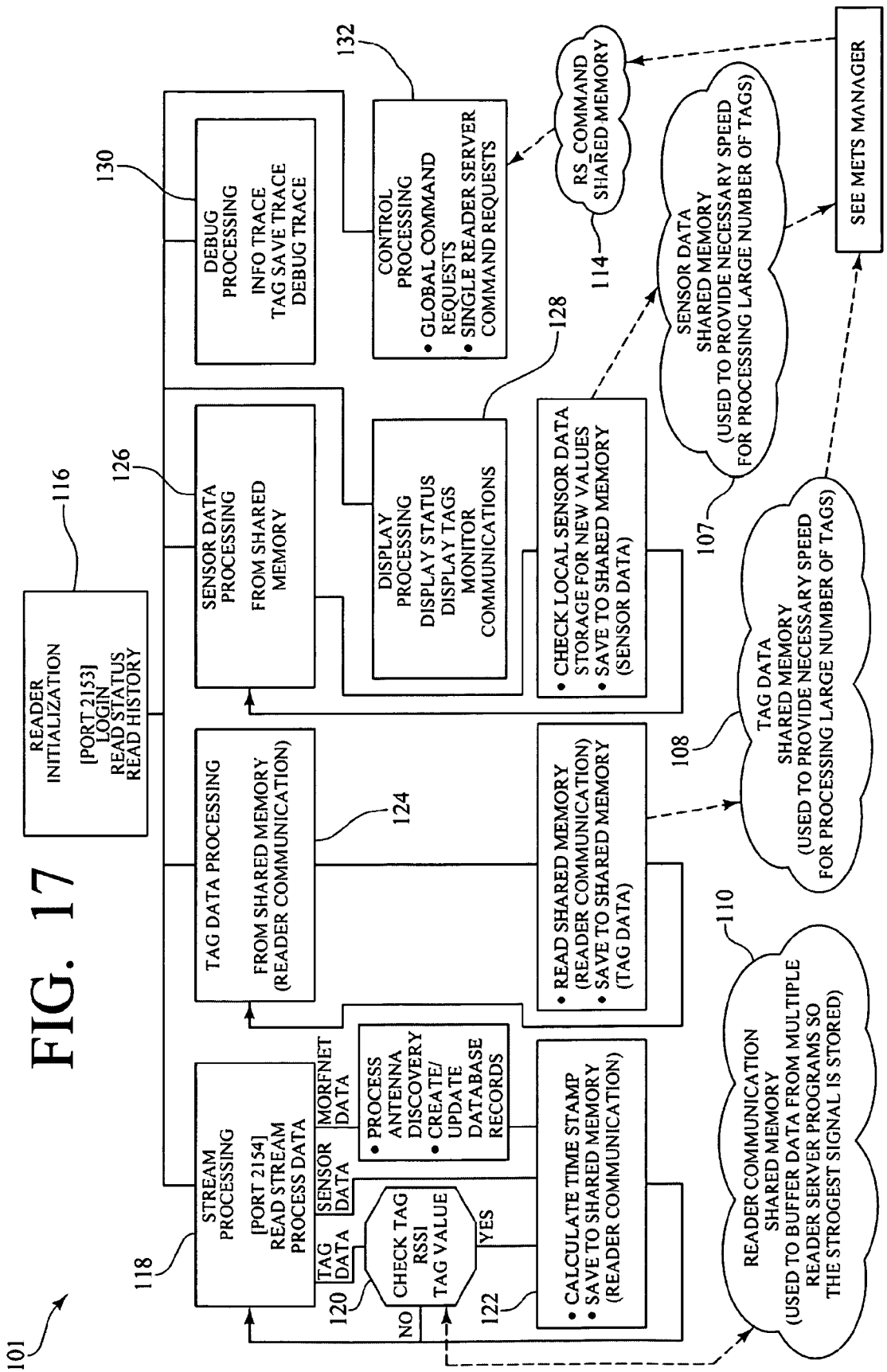
FIG. 17 is a process chart of an exemplary server module of the exemplary software system of FIG. 16.

FIG. 17 is a process chart of the server module 101, which acts as an interface to the antennas (e.g., 26a-26i, 28a-28i). A Reader Initialization process 116 first initializes the hub cable driver 30 and all of the antennas (e.g., 26a-26i, 28a-28i), which includes reading the status of the hub cable driver 30 and the antennas (e.g., 26a-26i, 28a-28i), and reading historical data from the hub cable driver 30 and antennas (e.g., 26a-26i, 28a-28i). This provides the function of reading information from the hub cable driver 30 and antennas (e.g., 26a-26i, 28a-28i) when the server 36 has been down. Following the Reader Initialization process 116, there are six processes that occur within the server module 101.

The first process is a Stream Processing process 118. Once the Reader Initialization process 116 is completed, the hub cable driver 30 and antennas (e.g., 26a-26i, 28a-28i) enter a "data streaming" mode. In the "data streaming" mode, the hub cable driver 30 and antennas (e.g., 26a-26i, 28a-28i) "stream" data from each tag 20, 22 that is read to the server 36, including a time stamp, the ID of the tag, the ID of the antenna receiving the signal, and an RSSI (Received Signal Strength Indicator) value. As mentioned above, each running server object 101a-101e handles a hub cable driver 30 and antennas (e.g., 26a-26i, 28a-28i), checking the tag data in step 120, and saving the tag data to Reader Communication Shared Memory 110 in step 122.

The second process is a Tag Data Processing process 124 for processing of data from the Reader Communication Shared Memory 110. The Reader Communication Shared Memory 110 serves as a buffer for data, and the Tag Data Processing process 124 reads the buffered data and saves only the tag data for the digital radio message having the highest RSSI for a particular tag 20, 22 at a particular time. The Tag Data Processing process 124 saves the buffered or filtered data to the Tag Data Shared Memory 108, thereby identifying the antenna that is closest to the tag 20, 22 at that particular time. This buffering process ensures that only valid, new, and the strongest tag data is passed on to the manager module 102 for storage in the server database 112.

The third process is a Sensor Data Processing process 126 for processing of sensor data to the Sensor Data Shared Memory 107.

The fourth process is a Display Processing process 128. Display processing 128 displays a status of the hub cable driver 30 and antennas (e.g., 26a-26i, 28a-28i) and monitors communications.

The fifth process is a Debug Processing process 130, which provides an engineer or technician the ability to troubleshoot the processing that is going on within the programming and determine whether tag data is being stored correctly. This is done by gathering data and then displaying that data in a trace box that is available within the server module 101.

The sixth process is a Control Processing process 132 for processing commands from the manager module 102. The manager module 102 sends commands to the RS Command Shared Memory 114 and the Control Processing process 132 processes the commands and then provides the appropriate action steps within the server module 101.

Figure 18:
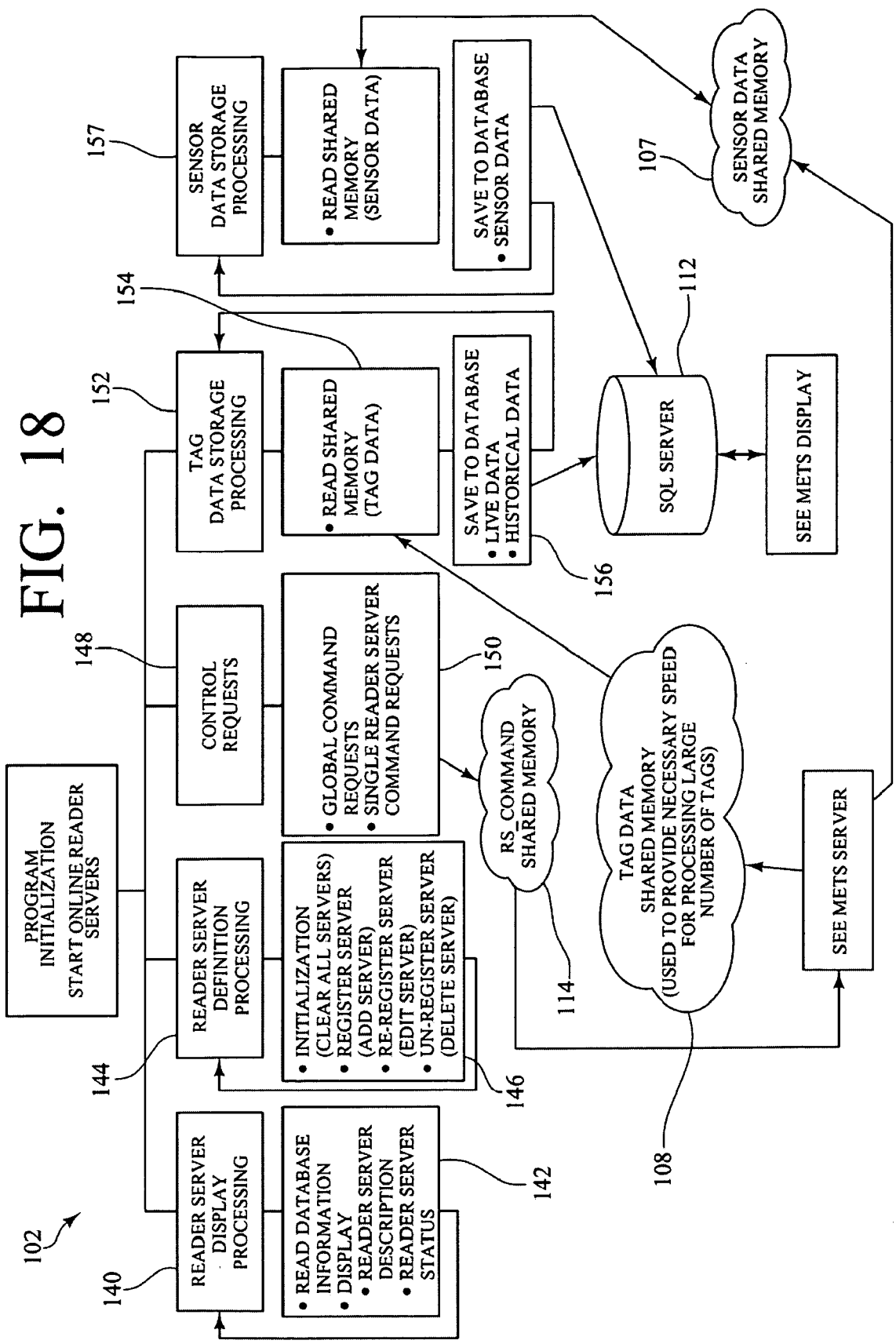
FIG. 18 is a process chart of an exemplary manager module of the exemplary software system of FIG. 16.

FIG. 18 is a process chart of the manager module 102, which provides management of the hub cable driver 30 and the associated antennas (e.g., 26a-26i, 28a-28i).

A first process is a Reader Server Display Processing process 140. The Reader Server Display Processing process 140 reads database information and displays the server description and the server status (box 142) in a tabular form on a main screen generated by the manager module 102.

A second process is a Reader Server Definition Processing process 144. The Reader Server Definition Processing process 144 initializes the system 10 when a hub cable driver 30 and the associated antennas (e.g., 26a-26i, 28a-28i) are not currently active. It registers new servers, re-registers or edits old servers, and un-registers or deletes servers from the system 10 (box 146).

A third process is a Control Requests process 148. The Control Requests process 148 runs in conjunction with the Control Processing process 132 (FIG. 17) of the Server module 101. The Control Requests process 148 provides an operator with a method of sending global commands and single-reader specific commands (box 150) to the server module 101, and the server objects (e.g., 102a-102e). Examples of such functions are: setting up options within the server objects, such as turning on functions like time synchronization on a daily basis, or clearing of the reader history once the server module 101 has initialized. The Control Requests process 148 also provides commands such as instantaneous clearing the history or forcing a time synchronization. This data is sent to the server module 101 and the server objects (e.g., 101a-101e) through the RS command shared memory region 114.

A fourth process is a Tag Data Storage Processing process 152. The Data Storage Processing process 152 provides the primary function of the manager module 104, which is data storage into the server database 112. The first step 154 is to read tag data from the Tag Data Shared Memory 108. Then, in step 156, the tag data is saved into the Live Tag Data Table 113 of the server database 112. Further, additional processing determines whether the Historical Data Table 115 also needs to be updated. The Historical Data Table 115 is updated, at most, every 10 seconds and new records are created in the Historical Data Table 115 as the manager module 104 determines that tags 20, 22 have moved from being closer to one antenna 24 to another.

A final process is a Sensor Data Storage Processing process 157, which mirrors the Tag Data Storage Processing process 152 for sensor data.

Figure 19:
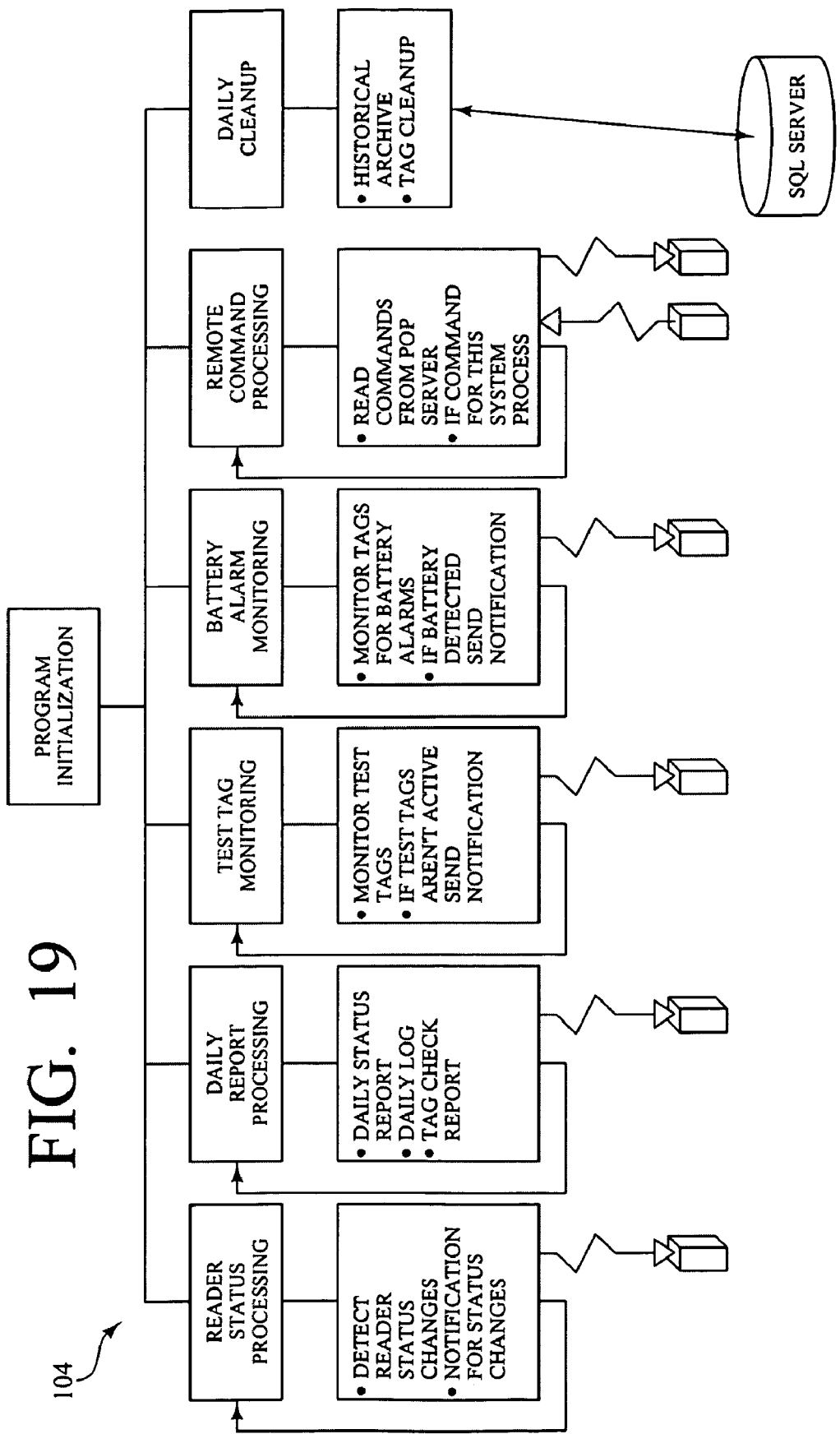
FIG. 19 is a process chart of an exemplary monitor module of the exemplary software system of FIG. 16.

FIG. 19 is a process chart of the Monitor Module process 104. Reader status processing detects status changes of the hub cable driver 30 and the associated antennas (e.g., 26a-26i, 28a-28i), and generates notifications, via email, of a status change. Daily report processing generates daily reports, a daily log, and a tag check report. Test tag monitoring monitors test tags, and sends a notification if the test tags are not active. Battery alarm monitoring monitors tags for battery alarms, and sends a notification if a battery alarm is detected. Remote command processing reads commands from an email server, and processes commands contained in emails. Daily cleanup cleans up historical data and erroneous tag data.

Figure 20:
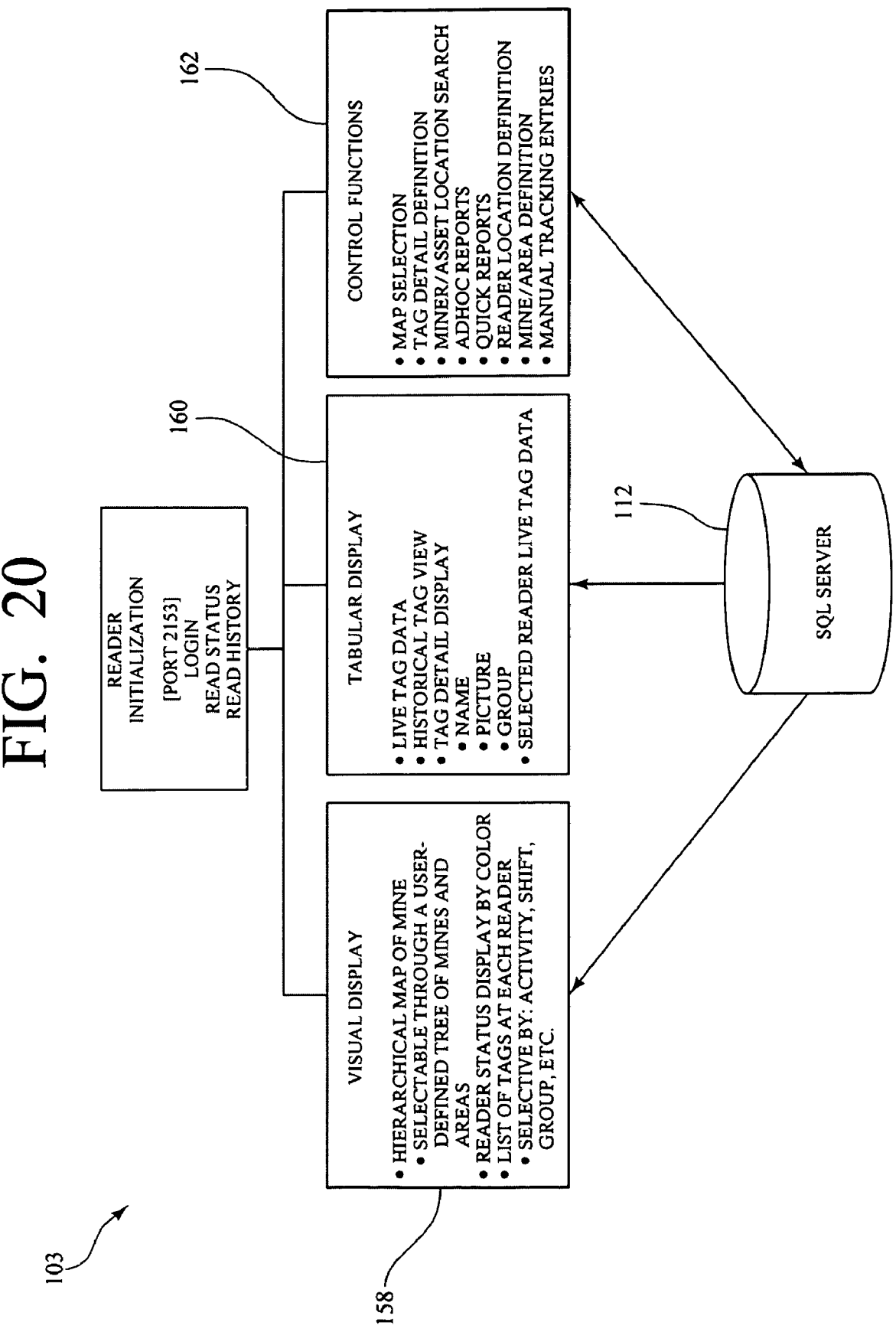
FIG. 20 is a process chart of an exemplary view module of the exemplary software system of FIG. 16.

FIG. 20 is a process chart of the view module 103, which provides the main user interface for the system 10. The display module 103 is used by operators and technicians at a mine to be able to visualize the information that is stored in the server database 112. There are three primary functions/processes of the display module 103.

The first process is a Visual Display process 158, which displays a user defined hierarchical tree of the mine and then, by selecting elements within that tree, the user can view different portions of the mine. The user has the ability to define those different areas within the mine and even different mines in a case where the system is used to view data from multiple mines. The status of the antennas (e.g., 26a-26i, 28a-28i) are displayed on a visual map of the mine, and that status is indicated by the color and also a list of the tags 20, 22 being seen at each antenna (e.g., 26a-26i, 28a-28i) displayed on the map. That list is selective, based on the level of activity of the tag, based on the current time and date, and based on group membership of the tags 20, 22.

The second process is a Tabular Display process 160, which displays data in the form of a table. The Tabular Display process 160 provides options of displaying Live Tag data and Historical Tag data. Further, when a particular tag 20, 22 is selected within the table, the Tabular Display process 160 displays detailed information for that tag 20, 22, including information such as the name, the employee number, group membership, and a picture of the individual or of the equipment that is assigned to that tag 20, 22.

The final process of the display module 103 is a Control Functions process 162. The Control Functions process 162 defines functions where: map images can be selected and stored within the server database 112; details of a tag 20, 22 can be defined, such as employee numbers, and photographs; the location of a miner or an asset can be searched through a "find" button; predefined quick reports or ad hoc reports can be generated, with selectively picked data ranges; reports for individual tags 20, 22, group membership, or groups of tags can be printed; and antenna locations can be defined through drag-and-drop functions. Additionally, the Control Functions process 162 also provides for defining areas of the mine and image files that represent the background for the particular mine and area. Lastly, the Control Functions process 162 includes an ability to manually set an alarm to sound if a tag 20, 22 known to leave the monitored area does not reappear in the monitored area in a predetermined amount of time.

Figure 21:
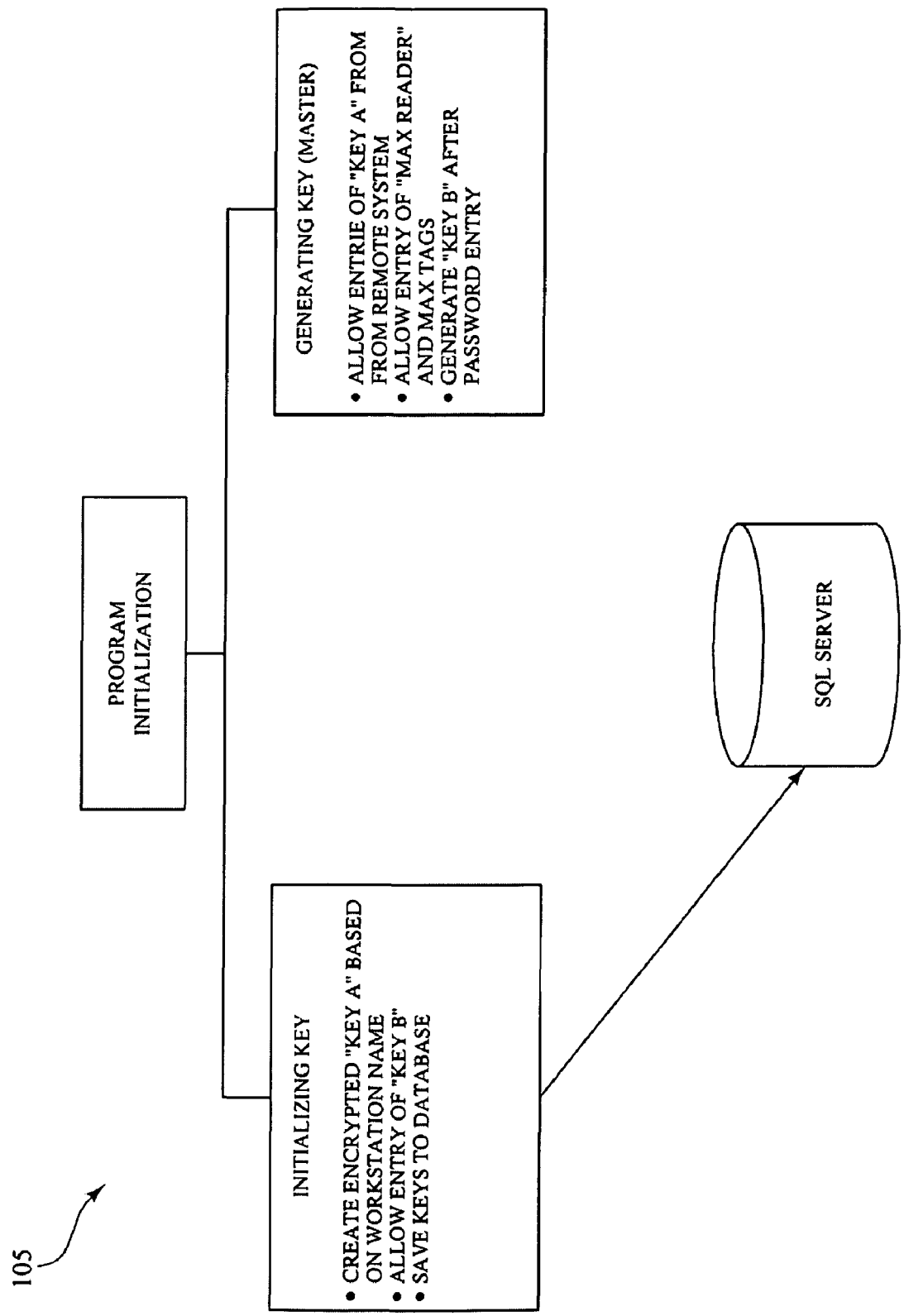
FIG. 21 is a process chart of an exemplary key module of the exemplary software system of FIG. 16.

FIG. 21 is process chart of the key module 105, which must be run to generate an initialization string, or first key ("Key A"), which must be reported for the generation of a second key ("Key B"). The first key and the second key function as a license control system.

FIG. 22 is a process chart of the OPC module 106 that provides a way to get data in and out from other systems that support OPC ("OLE for process control").

L. Additional Steps and Configurations

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

Thus, the scope of the invention should be determined by the appended claims and their legal equivalents, and not by the examples given.

What is claimed is:

1. A system for tracking personnel and equipment in a hazardous environment comprising:
    a tracking tag for being attached to one of a person and a piece of equipment in the hazardous environment, the tracking tag being intrinsically safe and periodically transmitting a radio signal containing a unique tracking tag identification code identifying the tracking tag;
    an intrinsically safe reader system including a hub cable driver and a plurality of intrinsically safe antennas, the hub cable driver and the plurality of intrinsically safe antennas connected by communication cables;
    the hub cable driver feeding an intrinsically safe power signal into the communication cables and coupling bidirectional data signals onto the power signal, such that the hub cable driver provides intrinsically safe power to and communication with said plurality of intrinsically safe antennas over said communication cables;
    the plurality of intrinsically safe antennas located in the hazardous environment in a redundant connective infrastructure topology, each intrinsically safe antenna configured to:
        receive the radio signal from said tracking tag; and
        transmit a data signal to the hub cable driver over said communication cables, the data signal containing an antenna identification code identifying the antenna and a tracking tag identification code identifying the tracking tag;
    wherein the system continues to operate in an explosive environment due to the intrinsically safe nature of the intrinsically safe tracking tag, the plurality of intrinsically safe antennas, and the intrinsically safe power and communication from the hub cable driver; and
    wherein the redundant connective infrastructure topology enables the system to continue to operate despite a communication disruption at a location along the redundant connective infrastructure topology.

2. The system of claim 1, wherein the intrinsically safe tracking tag is attached to a hard hat worn by the person in the hazardous environment.

3. The system of claim 1, wherein the intrinsically safe tracking tag is attached to a piece of equipment located in the hazardous environment, the intrinsically safe tracking tag for receiving equipment status and location information for the piece of equipment and periodically transmitting a radio signal containing a unique equipment tag identification code identifying the intrinsically safe equipment tag and the equipment status and location information.

4. The system of claim 1, wherein each intrinsically safe antenna has a first voltage domain, a switching regulator, and a second voltage domain, wherein each intrinsically safe antenna, to maximize intrinsic safety, receives power at a first voltage in the first voltage domain, and converts the power at the first voltage to power at a second voltage for use in the second voltage domain using the switching regulator.

5. The system of claim 1, wherein each intrinsically safe antenna has a plurality of communication ports for connecting with a plurality of other antennas, wherein said plurality of communication ports are un-powered and disconnected from each other until a command is received to power up and connect selected ones of said plurality of communication ports.

6. The system of claim 1, wherein the hub cable driver has an output port for providing said intrinsically safe power and communication, an IS protection block for detecting current and voltage levels at said output port, and a hub microcontroller for receiving said current and voltage levels from said IS protection block and disconnecting power from the output port when necessary.

7. The system of claim 1 further comprising an intrinsically safe atmospheric sensor positioned in the hazardous environment and in communication with the hub cable driver, the intrinsically safe atmospheric sensor being configured to: sense a gas level in an atmosphere at the intrinsically safe atmospheric sensor; and periodically transmit a signal to the hub cable driver containing a unique identification code identifying the intrinsically safe atmospheric sensor and a gas level reading value indicating a sensed gas level.

8. The system of claim 7, wherein said intrinsically safe atmospheric sensor is a wireless atmospheric sensor.

9. The system of claim 7, wherein said intrinsically safe atmospheric sensor is in communication with the hub cable driver by a communication cable, and wherein the intrinsically safe atmospheric sensor is further configured to receive power from the hub cable driver via the communication cable.

10. A system for tracking personnel and equipment in a hazardous environment, comprising:
    a plurality of tracking tags, each tracking tag for periodically transmitting a radio message containing a unique tracking tag ID, each tracking tag for being attached to a different person or piece of equipment present in the hazardous environment, each tracking tag being intrinsically safe;
    an intrinsically safe reader system including a hub cable driver and a plurality of intrinsically safe antennas connected to the hub cable driver and to each other by communication cables in a redundant connective infrastructure topology, each antenna being located in said hazardous environment for receiving radio messages from nearby tracking tags, determining a signal strength value of each received radio message, sending a tag data message for each received radio message to the hub cable driver, each tag data message including the received radio message, an antenna ID of the receiving antenna, and the signal strength value;
    a server database; and
    a server including:
        a server module for receiving tag data messages from said hub cable driver, determining a location of each tracking tag by determining the antenna receiving the radio message having a highest signal strength value;
        a manager module for maintaining a live tag data table in said server database, the live tag data table containing current location data for each tracking tag; and a view module for generating a display of a current location of each tracking tag on a map of at least a portion of the hazardous environment, and for generating selected displays of data for each tracking tag.

11. The system of claim 10, further comprising at least one atmospheric sensor in communication with the hub cable driver; wherein said server further includes a sensor data shared memory.

12. The system of claim 10, further comprising a monitor module for providing e-mail support for database reports and status notifications.

13. The system of claim 12, wherein the monitor module is further for reading and processing commands contained in e-mail messages received from an e-mail server.

14. The system of claim 10, further comprising a key module for providing a means to control licensing based a number of antennas and tracking tags permitted.

15. The system of claim 10, further comprising an OPC module for allowing OPC access to the server by external clients.

16. The system of claim 10, wherein the view module is further for setting an alarm to sound if a tracking tag known to leave a detectable vicinity of the intrinsically safe reader system does not reappear in the detectable vicinity of the intrinsically safe reader system in a predetermined amount of time.

* * * * *